(12) United States Patent
Kumar et al.

(10) Patent No.: US 7,524,465 B2
(45) Date of Patent: Apr. 28, 2009

(54) MULTI-ZONE CATALYTIC CONVERTER

(75) Inventors: Sanath V. Kumar, North Brunswick, NJ (US); Harold N. Rabinowitz, Upper Montclair, NJ (US); John J. Steger, Pittstown, NJ (US)

(73) Assignee: BASF Catalysts LLC, Florham Park, NJ (US)

( * ) Notice: Subject to any disclaimer, the term of this patent is extended or adjusted under 35 U.S.C. 154(b) by 279 days.

(21) Appl. No.: 11/482,651

(22) Filed: Jul. 7, 2006

(65) Prior Publication Data

US 2006/0251549 A1    Nov. 9, 2006

Related U.S. Application Data

(62) Division of application No. 10/183,863, filed on Jun. 27, 2002, now abandoned.

(51) Int. Cl.
*B01D 50/00* (2006.01)
(52) U.S. Cl. ........................................ 422/180
(58) Field of Classification Search ............... 422/171, 422/177, 180, 211, 222; 60/297, 299
See application file for complete search history.

(56) References Cited

U.S. PATENT DOCUMENTS

| | | | | |
|---|---|---|---|---|
| 4,134,860 A | 1/1979 | Hindin et al. | ............... | 252/466 |
| 4,189,404 A | 2/1980 | Keith et al. | .................. | 252/462 |
| 4,609,563 A | 9/1986 | Shimrock et al. | ............. | 427/8 |
| 4,714,694 A | 12/1987 | Wan et al. | ................... | 502/304 |
| 5,010,051 A | 4/1991 | Rudy | ......................... | 502/304 |
| 5,057,483 A | 10/1991 | Wan | ........................... | 502/304 |
| 5,510,086 A | 4/1996 | Hemingway et al. | ........ | 422/171 |
| 5,597,771 A | 1/1997 | Hu et al. | ..................... | 502/304 |
| 5,676,912 A | 10/1997 | Sharma et al. | ........... | 423/213.2 |
| 5,792,436 A | 8/1998 | Feeley et al. | ................. | 423/210 |
| 5,953,832 A | 9/1999 | Rosynsky et al. | ............. | 34/403 |
| 6,044,644 A | 4/2000 | Hu et al. | ....................... | 60/302 |

(Continued)

FOREIGN PATENT DOCUMENTS

WO    WO 92/09848    6/1992

(Continued)

OTHER PUBLICATIONS

U.S. Appl. No. 09/067,820, filed Apr. 28, 1998, Dettling et al.

(Continued)

*Primary Examiner*—Tom Duong
(74) *Attorney, Agent, or Firm*—Melanie L. Brown

(57) ABSTRACT

Provided is an exhaust article (catalyst) coated on a single substrate, such as a monolithic honeycomb having a plurality of channels along the axial length of the catalyst. Different washcoat compositions are deposited along the length the channel walls of the substrate beginning from either the inlet or outlet axial end of the substrate to form inlet and outlet catalyst layers, respectively. In the coating process, the channel walls are coated with catalyst washcoat compositions to lengths that are less than the substrates' axial length. The architecture of the resulting catalyst layers defines a plurality of zones along the length of the substrate. The properties of each zone of the catalyst can be optimized to address specific catalyst functions by manipulation of both the coating lengths and the catalyst washcoat compositions.

25 Claims, 12 Drawing Sheets

U.S. PATENT DOCUMENTS

| | | | |
|---|---|---|---|
| 6,074,973 A | 6/2000 | Lampert et al. | 502/60 |
| 6,087,298 A | 7/2000 | Sung et al. | 502/333 |
| 6,105,365 A | 8/2000 | Deeba et al. | 60/274 |
| 6,171,556 B1 | 1/2001 | Burk et al. | 422/173 |
| 6,180,075 B1 | 1/2001 | Lindner et al. | 423/213.2 |

FOREIGN PATENT DOCUMENTS

| | | |
|---|---|---|
| WO | WO 95/00235 | 5/1995 |
| WO | WO 95/35152 | 12/1995 |
| WO | WO 99/47260 | 9/1999 |
| WO | WO 99/55459 | 11/1999 |
| WO | WO 01/12320 A1 | 2/2001 |

OTHER PUBLICATIONS

Numerical Approach for Improving the Conversion Characteristics of Exhaust Catalysts Under Warming-Up Condition; Society of Automotive Engineers 962076. Baba, et al. (1996) 141-156.

MULTI-ZONE CATALYTIC CONVERTER

CROSS REFERENCE TO RELATED APPLICATION

The present application is a divisional of currently U.S. Ser. No. 10/183,863 filed Jun. 27, 2002 now abandoned entitled, "Multi-Zone Catalytic Converter", which is incorporated herein by reference.

The present invention relates to an exhaust article (catalyst) coated on a single substrate having multiple catalytic zones along the axial length of the catalyst. The properties of each zone of the catalyst can be optimized to address specific catalyst functions. The invention also relates to methods for the preparation of the articles.

Catalytic converters are well known for the removal and/or conversion of the harmful components of exhaust gases. Catalytic converters have a variety of constructions for this purpose. In one form, the converter comprises a rigid skeletal monolithic substrate on which there is a catalytic coating. The monolith has a honeycomb-type structure which has a multiplicity of longitudinal channels, typically in parallel, to provide a catalytically coated body having a high surface area.

Monolithic honeycombs containing different catalyst compositions in zones along the length of the honeycomb are known for use in catalytic combustion processes from references such as WO 92/09848. It is disclosed that graded catalyst structures can be made on ceramic and metal monolith structures by a variety of processes. Monoliths can be partially dipped in washcoat and excess washcoat blown out of the channel. The process is repeated by dipping further into the washcoat sol. Alternatively, washcoat is disclosed to be applied to metal foil which is then rolled into a spiral structure. The washcoat is disclosed to be sprayed or painted onto the metal foil or applied by other known techniques such as by chemical vapor deposition, sputtering, etc.

Copending U.S. patent application Ser. No. 09/067,820, filed Apr. 28, 1998 herein incorporated by reference, also discloses the use of zoned catalyst structures, as well as methods for their preparation. The zoned catalyst structures comprise coated honeycomb substrates having different zones along the length of the channels. The zones are defined by their coating (or lack of coating) and extend for a length of the channel in which there is the same coating and architecture. Soluble components, such as catalytic components (e.g. platinum group metals) or promoters (e.g., rare earth metal salts) in coating compositions are fixed in their respective zones.

In order to meet ever more stringent emission standards set by various regulatory agencies with minimum manufacturing and material costs, it is desirable to refine zone-coating technologies and optimize placement of particular catalytic or pollutant absorbent compositions along the catalyst's length. In particular, further improvements in manufacturing can reduce catalyst processing times. Refinements in catalyst architecture include optimizing placement of catalytic or pollutant absorbent compositions along the substrate's length.

SUMMARY OF THE INVENTION

In one embodiment, the invention relates to an exhaust gas treatment article, having a substrate with an inlet axial end (14), an outlet axial end (14'), wall elements (18) having a length extending between the inlet axial end to the outlet axial end and a plurality of axially enclosed channels (16) defined by the wall elements. See for example, FIGS. 1-3. An inlet layer (26) is deposited on the wall elements beginning at the inlet axial end and has a length extending for less than the wall elements' length. The inlet layer has a first inlet palladium component. An outlet layer (28) contains an outlet palladium component, and at least partially overlies the wall elements and the inlet layer. The outlet layer begins at the outlet axial end extends for less than the wall elements' length. The coating architecture thereby defining three zones; an inlet zone (20), an intermediate zone (24), and a downstream zone (22).

In a preferred embodiment, the inlet layer also contains an inlet refractory oxide support and an inlet oxygen storage component. The outlet layer also contains an outlet refractory oxide support.

In another preferred embodiment, the inlet layer extends from the inlet axial end of the substrate for at least 90% and no more than 97% of the wall elements' length, and the outlet layer extends from the outlet axial end of the substrate for at least 90% and no more than 97% of the wall elements' length. Preferably, there is at least 5 g/ft$^3$ of inlet palladium component in the inlet layer, and there is at least 5 g/ft$^3$ of outlet palladium component in the outlet layer.

In another embodiment, the invention relates to an exhaust gas treatment article having a substrate with an inlet axial end (14), an outlet axial end (14'), wall elements (18) having a length extending between the inlet axial end to the outlet axial end and a plurality of axially enclosed channels (16) defined by the wall elements. See, for example, FIG. 4. In this embodiment, an outlet layer (34) is deposited on the wall elements beginning at the outlet axial end, and has a length extending for less than the wall elements' length. The outlet layer has a first outlet palladium component. An inlet layer (30) contains an inlet rhodium component and at least partially overlies the wall elements and the inlet layer. The inlet layer begins from the inlet axial end and extends for less than the wall elements' length. Preferably, each of the inlet and outlet layers have a length extending for at least 90% and no more than 97% of the wall elements' length.

In a preferred embodiment, the inlet layer also has an inlet refractory oxide support and an inlet oxygen storage component, and the outlet layer has an outlet support.

Another aspect of the invention relates to an exhaust gas treatment article with a multi-zone coating architecture that includes an additional catalyst coating layer segment. See, for example, FIGS. 5 and 6. Here again, the article includes a substrate with an inlet axial end, an outlet axial end, wall elements having a length extending between the inlet axial end to the outlet axial end and a plurality of axially enclosed channels defined by the wall elements. A first inlet layer (32) is deposited on the wall elements beginning at the inlet axial end and extends for less than the wall elements' length. A first outlet layer (36) at least partially overlies the wall elements and the first inlet layer, and beginning at the outlet axial end, extends for less than the wall elements' length. Preferably, the first inlet layer and the first outlet layer each extend for at least 60% of the wall elements' length.

The article includes a second layer that is one of:

a) a second inlet layer (38A, see, for example, FIG. 5) overlying at least part of the first inlet layer, beginning at the inlet axial end and having a length extending for no more than 50% of the wall elements' length, or b) a second outlet layer (38B, see, for example, FIG. 6) overlying at least part of the first outlet layer, beginning at the outlet axial end and having a length extending for no more than 50% of the wall elements' length.

Preferably, the second layer has a washcoat loading of less than 1.5 g/in$^3$, more preferably less than 0.5 g/in$^3$.

In one preferred embodiment of this multi-zone article, the second layer is a second inlet layer. Preferably, the second inlet layer has one or more platinum group metal components having a loading of at least 20 g/ft$^3$. The platinum group metal component in the second inlet layer preferably includes an inlet palladium component or a combination of an inlet palladium and platinum component. Preferably, there is at least 80 g/ft$^3$ of second inlet palladium component in the second inlet layer.

In a particularly preferred embodiment of this multi-zone article with a second inlet layer, the first inlet layer has a first inlet palladium component, a first inlet refractory oxide support and a first inlet oxygen storage component. Preferably, the first inlet layer also includes a first platinum component. The first outlet layer has a first outlet platinum component, a first outlet rhodium component and a first outlet refractory oxide support.

In another preferred embodiment of the article, the second layer is a second outlet layer. The second outlet layer preferably has a second outlet palladium component, or both a second outlet palladium component and a second outlet platinum component. In a particularly preferred embodiment of this multi-zone article, the first inlet layer has a first inlet palladium component, a first inlet refractory oxide support and a first inlet oxygen storage component. Preferably, the first inlet layer further includes a first inlet platinum component. The first outlet layer has a first outlet platinum component, a first outlet rhodium component and a first outlet refractory oxide support.

In another aspect, the invention relates to an exhaust article with an undercoat layer (see, for example, FIG. 7). The article has a substrate with an inlet axial end, an outlet axial end, wall elements having a length extending between the inlet axial end to the outlet axial end and a plurality of axially enclosed channels defined by the wall elements. The undercoat layer (40) is deposited on the wall elements and is preferably coated from the inlet axial end to the outlet axial end. The undercoat layer can have, for example, nitrogen oxides adsorption material or hydrocarbon trapping material. A first inlet layer (32) is deposited on the undercoat layer beginning at the inlet axial end and extends for less than the wall elements' length. A first outlet layer (36) at least partially overlies the undercoat layer and the first inlet layer. The first outlet layer is coated from the outlet axial end, and extends for less than the wall elements' length. The second outlet layer overlies at least part of the first outlet layer, beginning at the outlet axial end, and extends for no more than 50% of the wall elements' length.

In a preferred embodiment, the second outlet layer includes a second outlet rhodium component, or a combination of a second outlet rhodium component and a second outlet platinum component. Preferably, the second outlet layer has a platinum group metal loading of at least 5 g/ft$^3$.

DETAILED DESCRIPTION OF THE INVENTION

Definitions

The following terms shall have, for the purposes of this application, the respective meanings set forth below.

"promoter" refers a material that enhances the conversion of a desired chemical to another. In a TWC catalyst the promoter enhances the catalytic conversion of carbon monoxide and hydrocarbons into water and carbon dioxide and nitrogen oxides into nitrogen and oxygen.

"support" or "catalyst support" refers to particulate materials, typically refractory metal oxides, e.g., alumina, that are part of the catalyst composition.

"three way conversion" or "TWC" refers to the simultaneous combustion of unburned hydrocarbons, carbon monoxide and nitrogen oxides.

The present invention is directed to improved zone-coated catalyst structures and methods for their manufacture. The current invention integrates several catalytic compositions such as a hydrocarbon light-off catalyst, a three-way conversion (TWC) catalyst, a hydrocarbon trap, or a NOx trap into a single unit. The processes of the present invention reduce processing times and lower unit cost of catalysts.

In the preparation of the catalysts of the invention, different washcoat compositions are deposited along the length the channel walls of the substrate beginning from either the inlet or outlet axial end of the substrate to form inlet and outlet catalyst layers, respectively. In the coating process, the channel walls are coated with catalyst washcoat compositions to lengths that are less than the substrates' axial length. The architecture of the resulting catalyst layers defines a plurality of zones along the length of the substrate. An exhaust gas stream, passing from the inlet axial end to the outlet axial end, encounters different catalyst layers or different combinations of catalyst layers as it passes from one zone of the catalyst to another. Through the placement and choice of the composition of each catalyst layer, different functions can be incorporated into the catalyst depending on the needs of various exhaust systems. The invention therefore provides flexibility to meet a number of emission abatement goals, e.g., enhanced hydrocarbon combustion at low temperature, improved NOx activity and the like.

Figure 1:
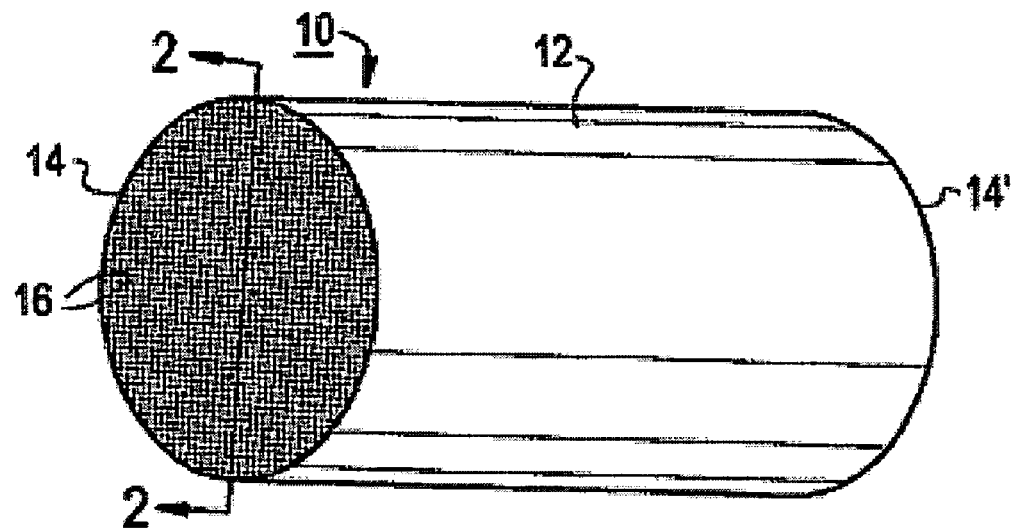
FIG. 1 is a view of in perspective of a honeycomb substrate.
Figure 2:
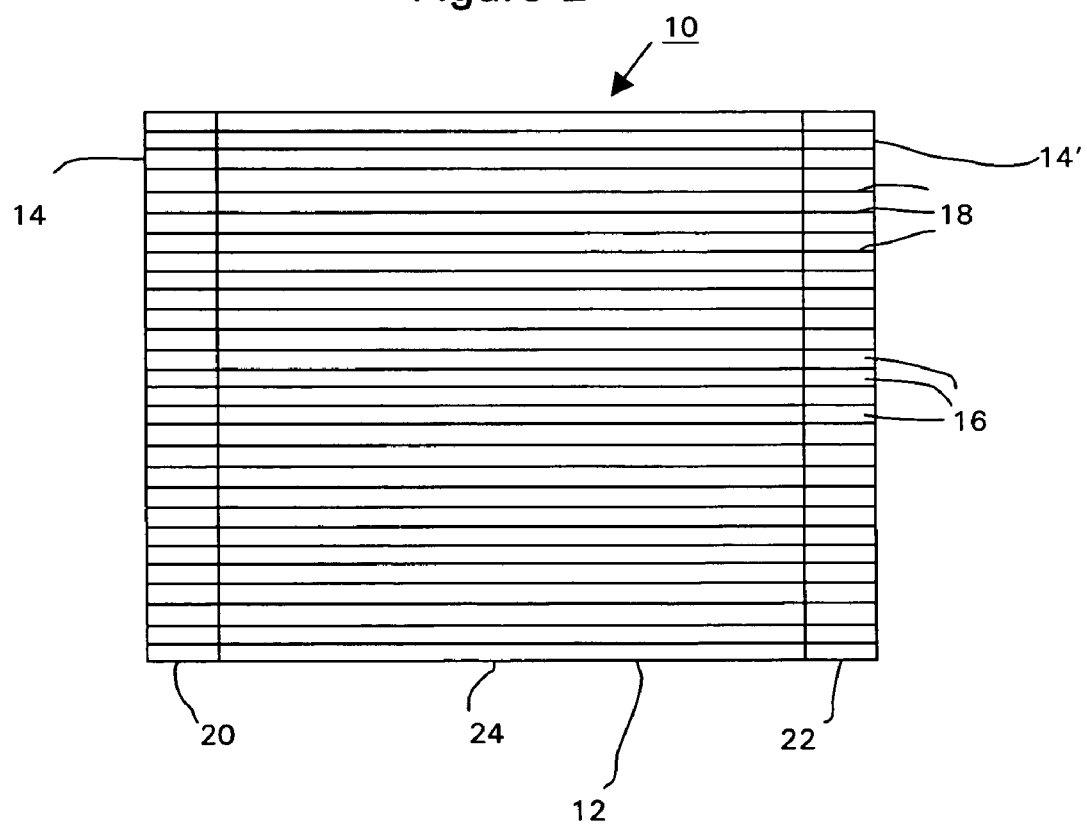
FIG. 2 is a sectional view of the honeycomb of FIG. 1 along Section 2-2.

As can be seen in FIGS. 1 and 2, honeycomb monolith substrates (10) comprise an outer surface (12), an inlet axial end (14) and an outlet axial end (14'). There are a plurality of parallel channels (16) defined by the honeycomb walls (18). Each channel has a corresponding inlet and outlet. The honeycomb has different zones along the length of the channels. The walls (18) of the different zones are coated with different catalyst compositions or architectures. The honeycomb monoliths have different zones along the length of the channels. The term "architecture" is used to mean the physical design of the coating in a zone considering parameters such as the number of layers of coating compositions, the thickness of the layers, and the order of layers where there are more than one layer. The zones are defined by their coating and extend for a length of the channel in which there is the same coating and architecture. For example, a two zoned catalyst coating defines a zone until it bounds with an adjacent zone having different compositions or different numbers of layers. FIG. 2, for example, shows a sectional view 2-2 of the honeycomb of FIG. 1 containing three zones.

Each of the layers on the monolith substrates are formed from washcoat compositions. Washcoat compositions typically contain catalytic agents which comprise one or more platinum group metal components (e.g., platinum, palladium, rhodium, ruthenium and iridium) located upon a high surface area, refractory oxide support, e.g., a high surface area alumina coating. Other additives such as oxygen storage components (e.g., ceria), binders, sulfide suppressants, stabilizers and promoters can be included in the composition. When the compositions are applied as a thin coating to a monolithic carrier substrate, the proportions of ingredients are conventionally expressed as grams of material per cubic inch of catalyst as this measure accommodates different gas flow passage cell sizes in different monolithic carrier substrates. In the case of platinum group metal components, the proportions of these components deposited are also commonly expressed as grams of material per cubic foot of catalyst. Weight of the palladium component and other platinum group metal components recited below in preferred catalysts are based on the weight of the metal.

Three Zone Bilayer Catalyst

Figure 3:
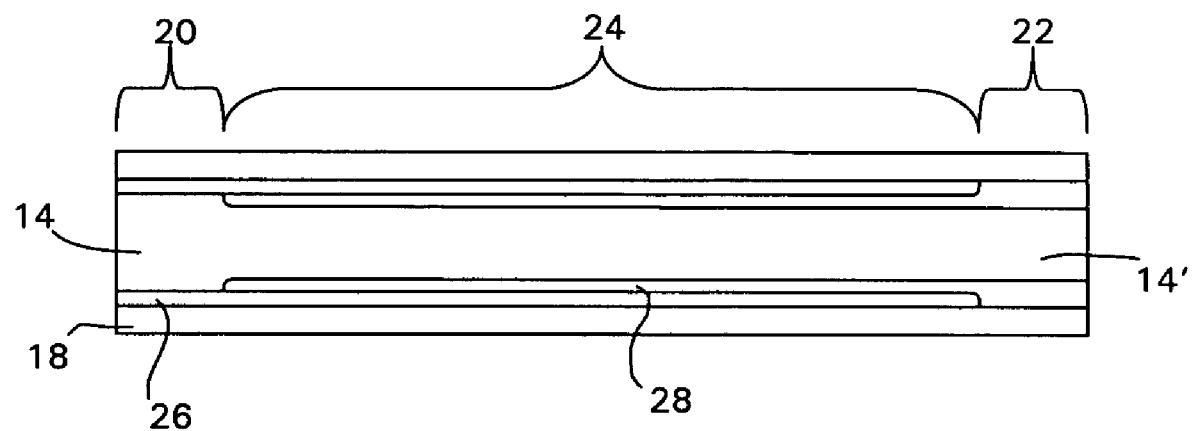
FIGS. 3 to 7 are schematic drawings illustrating various example substrate designs of the present invention.

In one embodiment, the invention provides a honeycomb monolith substrate (10) having channel walls coated with an inlet layer composition and an outlet layer composition according to the coating architecture depicted in a sectional view of a single channel of a monolith in FIG. 3. The inlet layer (26) is coated on the channel walls (18) of the substrate from the inlet axial end (14) to a length that is less than the axial length of the substrate. The outlet layer (28) is also coated on the channel walls from the outlet axial end (14') of the substrate to a length that is less than the length of the substrate. The lengths of the inlet and outlet layers can be the same or different, so long as at least part of the inlet and outlet layer overlap along an intermediate portion of the substrate. The overlapping architecture thereby defines three catalyst zones along the axis of the substrate: an upstream zone (20) having channel walls coated only by the inlet layer; an intermediate zone (24) wherein the channel walls are coated with both an inlet and outlet layer; and a downstream zone (22) having channel walls containing only an outlet layer coating. An exhaust gas flowing along the axial length of this embodiment would first pass through the upstream zone, then through the intermediate zone and finally through the downstream zone.

Figure 4:
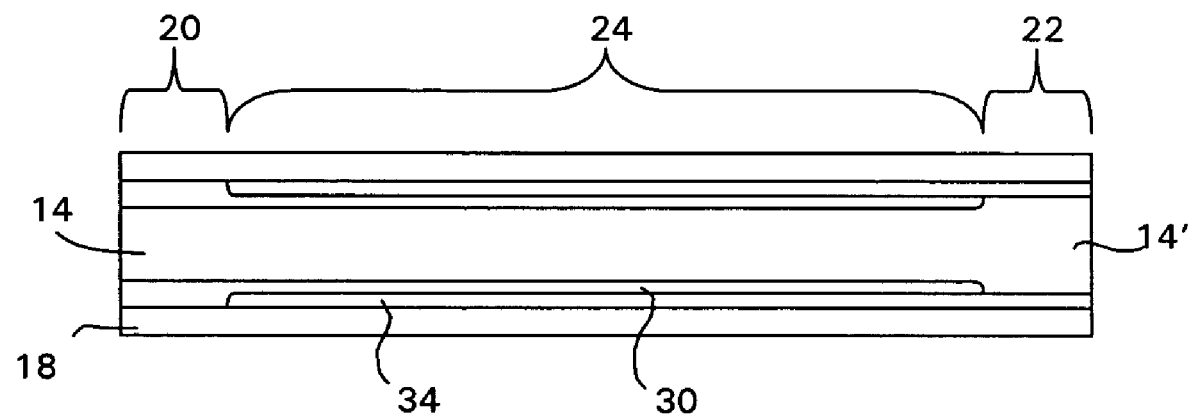

In an alternative configuration of this three-zone bilayer catalyst, a segment of the inlet layer (30) overlies and adheres to a segment of the outlet layer (34) as depicted in the sectional view of a single channel in FIG. 4.

Depending on the washcoat compositions used to form the inlet and outlet layers, each of the three zones can have different catalytic properties and functions. The catalyst can be adapted to provide different catalytic functions such as hydrocarbon combustion at low catalyst temperatures, high nitrogen oxides conversion, or efficient three-way pollutant performance, depending upon the needs of the exhaust system. Up to three catalyst functions can be provided on a single substrate resulting in reduced catalyst volumes and reduced catalyst manufacturing costs. Moreover, a single substrate having several catalytic functions decreases the burden of housing multiple conventional catalyst substrates each having separate functions in one or more canisters.

Advantageously, the length of each of the inlet and outlet layer can vary, so long as at least partial segments of the layers overlap (to maintain three zones) so that the catalyst can be adapted to exhaust systems having different hydrocarbon and carbon monoxide/nitrogen oxides performance requirements. In a preferred embodiment, each of the inlet and outlet layers have a length of at least 90% of the axial length of the substrate, so that the intermediate zone has a length of at least 80% of the substrate.

Due to the reduced coating lengths of each of the layers, the material costs (especially the cost of the platinum group metals) of the catalysts having the coating architecture of FIG. 3 and 4 are less than the material costs associated with a conventional bilayer catalyst prepared on the same substrate length and with the same washcoat compositions. Using the coating architecture of FIG. 3 or 4, the reduced materials costs may either be taken as a cost saving to reduce the overall cost of the catalyst, or the conserved platinum group metal may be incorporated into the washcoat to increase the platinum group metal concentration in the layers deposited on the reduced coating length. The latter strategy can be used to enhance the catalyst's performance.

As mentioned above, the catalyst having the coating architecture shown in FIG. 3 is useful for a number of catalysts designed for different purposes. For example, using a monolith substrate having a coating architecture as depicted in FIG. 3, a catalyst can have an upstream zone (20) wherein low temperature hydrocarbon performance is emphasized, while the intermediate (24) downstream zones (22) emphasize other catalyst functions such as carbon monoxide/nitrogen oxides treatment. In this configuration, the upstream zone not only provides the enhanced hydrocarbon performance at lower temperatures, but the heat from the combustion of the hydrocarbons also serves to heat the other zones of the substrate to higher temperatures where other catalytic reactions such as carbon monoxide oxidation and nitrogen oxides reduction are optimized.

Catalyst A

In one example of a preferred catalyst having these functions and the coating architecture of FIG. 3, there is provided a catalyst containing three platinum group metal components. The inlet layer (26) contains either an inlet palladium component or a combination of inlet palladium and inlet platinum components. Preferably, the inlet platinum group metal components in the inlet layer are deposited in at least 80 g/ft$^3$ to ensure adequate hydrocarbon combustion at lower temperature. The outlet layer (28) contains an outlet rhodium component and an outlet platinum component. Preferably in this configuration the outlet layer overlies the inlet layer. With this architecture there is defined three catalyst zones with the upstream zone (20) characterized as being particularly well-suited for hydrocarbon combustion at lower temperatures, e.g., below 300° C., an intermediate zone (24) that maintains three way conversion performance at higher temperatures, and a downstream zone (22) suited for improved carbon monoxide/nitrogen oxides activity. The coating lengths of each of the inlet and outlet layers can be varied to change the performance characteristics of the catalyst to meet the demands of a particular exhaust system. For example, lengthening each of the inlet and outlet layer would result in a longer intermediate zone (24), which in turn, would result in a catalyst having improved TWC performance. The catalyst is designated herein as "Catalyst A". In a preferred embodiment of Catalyst A, the coating length of each of the inlet and outlet layers is at least 90% of the axial length of the substrate.

Preferred Catalyst A can be formed according to the coating architecture illustrated in FIG. 3 with the washcoat compositions similar to those disclosed in WO 95/35152, hereby incorporated by reference. The catalyst disclosed in WO 95/35152 is a bilayer catalyst having a first layer deposited on the channel walls of the substrate and a second layer overlying and adhering to the first layer.

In Catalyst A, the inlet layer composition comprises at least one first palladium component, and can optionally contain minor amounts of a platinum or rhodium component based on the total platinum or rhodium metal of the platinum and rhodium components in the inlet and outlet layers. The outlet layer composition comprises at least two outlet platinum group metal components with one of the platinum group metal components preferably being a platinum component and the other preferably being a rhodium component.

Platinum group metal component support components in the inlet and outlet layers of Catalyst A can be the same or different, and are preferably compounds selected from the group consisting of silica, alumina and titania compounds. Preferred inlet and outlet supports can be activated compounds selected from the group consisting of alumina, silica, silica-alumina, alumino-silicates, alumina-zirconia, alumina-chromia, and alumina-rare earth metal oxides (e.g., alumina-ceria).

A specific and preferred embodiment of Catalyst A relates to a layered catalyst composite comprising an inlet layer which comprises a inlet support having at least one palladium component and from 0 to less than fifty weight percent of an inlet layer platinum component based on the total amount of platinum metal in the inlet and outlet layers.

Preferably, the inlet layer (26) comprises an inlet support, an inlet palladium component, at least one inlet stabilizer, and at least one inlet rare earth metal component selected from ceria, neodymia and lanthana. The inlet layer can also comprise an inlet oxygen storage composition which comprises an inlet oxygen storage component. The outlet layer preferably comprises an outlet support, at least one outlet platinum component, at least one rhodium component, and an outlet oxygen storage composition. There can be from fifty to one hundred weight percent based on platinum metal of the outlet layer platinum component based on the total amount of platinum metal in the inlet and outlet layers.

The outlet layer (28) preferably comprises an "outlet" oxygen storage composition which comprises a diluted outlet oxygen storage component. The oxygen storage composition comprises a diluent in addition to the oxygen storage component. Useful and preferred diluents include refractory oxides. Diluent is used to mean that the outlet oxygen storage component is present in the oxygen storage composition in relatively minor amounts. The composition is a mixture which can be characterized as a composite which may or may not be a true solid solution. The outlet oxygen storage component is diluted to minimize interaction with the rhodium component. Such interaction may reduce long term catalytic activity. The outlet layer preferably comprises an outlet oxygen storage composition comprising a outlet oxygen storage component such as rare earth oxide, preferably ceria. The outlet oxygen storage component is diluted with a diluent such as a refractory metal oxide, preferably zirconia. A particularly preferred outlet oxygen storage composition is a co-precipitated ceria/zirconia composite. There is preferably up to 30 weight percent ceria and at least 70 weight percent zirconia. Preferably, the oxygen storage composition comprises ceria, and one or more of lanthana, neodymia, praseodymia, yttria or mixtures thereof in addition to ceria. A particularly preferred particulate composite comprises ceria, neodymia and zirconia. Preferably there is from 30 to 90 wt. % zirconia, 10-90% ceria, 0 and up to 10% neodymia. Optionally, the composite can additionally contain up to 20 wt. % lanthana and up to 50 wt. % praseodymia. The ceria not only stabilizes the zirconia by preventing it from undergoing undesirable phase transformation, but also behaves as an oxygen storage component enhancing oxidation of carbon monoxide and the reduction of nitric oxides.

Preferably, the outlet oxygen storage composition is in bulk form. By bulk form it is meant that the composition is in a solid, preferably fine particulate form, more preferably having a particle size distribution such that at least about 95% by weight of the particles typically have a diameter of from 0.1 to 5.0, and preferably from 0.5 to 3 micrometers. Reference to the discussion of bulk particles is made to U.S. Pat. Nos. 4,714,694 and 5,057,483 both hereby incorporated by reference.

The outlet oxygen storage component and optional inlet oxygen storage component are preferably selected from the cerium group and preferably consist of cerium compounds, praseodymium, and/or neodymium compounds. When using cerium group compounds it has been found that if sulfur is present in the exhaust gas stream, objectionable hydrogen sulfide can form. When it is preferred to minimize hydrogen sulfide, it is preferred to additionally use Group IIA metal oxides, preferably strontium oxide. Where it is desired to use cerium, praseodymium or neodymium compounds at least one of the inlet or outlet layers can further comprise a nickel or iron component to suppress hydrogen sulfide. Preferably, the inlet layer further comprises a nickel or iron component.

Stabilizers can be in either the inlet or outlet layers, and are preferably in the inlet layer. Stabilizers can be selected from at least one alkaline earth metal component derived from a metal selected from the group consisting of magnesium, barium, calcium and strontium, preferably strontium and barium.

Zirconium components in the inlet and/or outlet layers are preferred and act as both stabilizers and a promoters. Rare earth metal components (e.g., oxides) act to promote the catalytic activity of the inlet layer composition. Rare earth metal components are preferably selected from the group consisting of lanthanum metal components and neodymium metal components.

A useful and preferred inlet layer for Catalyst A has:
from about 0.0175 to about 0.3 g/in³ of palladium component;
from about 0 to about 0.065 g/in³ of an inlet platinum component;
from about 0.15 to about 2.0 g/in³ of an inlet support;
from about 0.025 to about 0.5 g/in³ of at least one inlet alkaline earth metal component;
from about 0.025 to about 0.5 g/in³ of an inlet zirconium component; and
from about 0.025 to about 0.5 g/in³ of at least one inlet rare earth metal component selected from the group consisting of ceria metal components, lanthanum metal components and neodymium metal component.

A useful and preferred outlet layer for Catalyst A has:
from about 0.001 g/in³ to about 0.03 g/in³ of a rhodium component;
from about 0.001 g/in³ to about 0.15 g/in³ of platinum;
from about 0.15 g/in³ to about 1.5 g/in³ of an outlet support;
from about 0.1 to 2.0 g/in³ of an outlet oxygen storage composition;
from about 0.025 g/in³ to about 0.5 g/in3 of at least one outlet rare earth metal component selected from the group consisting of lanthanum metal components and neodymium metal components; and
from about 0.025 to about 0.5 g/in³ of an outlet zirconium component.

Catalyst B

Another preferred catalyst of the invention has the architecture as described in FIG. 4 [wherein the inlet layer (30) partially overlies and adheres to the outlet layer (34)] is a catalyst that has enhanced TWC performance with reduced amounts of platinum group metal components relative to a conventional bilayer catalyst. The catalyst includes an inlet layer containing an inlet rhodium component and an outlet layer containing an outlet platinum component coated on a monolith substrate. This preferred catalyst is designated "Catalyst B". In a preferred embodiment of Catalyst B, the coating length of each of the inlet and outlet layers is at least 90% of the axial length of the substrate.

One of the performance benefits achieved using the coating architecture of the invention is illustrated with this catalyst. For example, the pollutant performance of a Rh/Pd (inlet layer/outlet layer) catalyst coated according to FIG. 4 (Catalyst B) was compared with the performance of a conventional, bilayer Rh/Pd (top layer/bottom layer) catalyst on a substrate of identical dimensions. Each catalyst was coated with the same washcoat compositions. While the entire axial length of the substrate of the conventional bilayer catalyst was coated with the washcoat compositions (i.e., Rh containing top coat, Pd containing bottom coat), each of the inlet and outlet layers in the catalyst coated according to FIG. 4 was coated to a length of only 90% of the axial length of the substrate.

When the nitrogen oxides emissions for each of the catalysts were collected by bag average tailpipe emissions according to the Federal Test Procedure (CFR40), a comparison of the results (FIG. 10) revealed that the nitrogen oxides emissions for the Rh/Pd catalyst coated according to FIG. 3 were significantly less than the conventional Rh/Pd bilayer catalyst. The coating architecture of FIG. 4 (and also FIG. 3) provides a catalyst that can be oriented in the exhaust stream in two directions. In this example, the choice of placement of the rhodium containing layer at the inlet axial end of the substrate resulted in decreased nitrogen oxides emissions. Thus, the coating architecture illustrated in FIGS. 3 and 4, provide additional options for orienting the catalyst in the exhaust stream, that ultimately affect the pollutant performance of the catalyst. The orientation can be selected to emphasize a particular performance attribute required by a particular exhaust system.

A useful and preferred inlet layer for Catalyst B has:
from about 1 g/ft³ to about 20 g/ft³ of an inlet rhodium component;
from about 0.3 g/in³ to about 0.5 g/in³ of an inlet alumina support;
from about 0.1 g/in³ to about 0.2 g/in³ of an inlet rare earth metal oxide component (particularly ceria); and
from about 0.3 g/in³ to about 0.7 g/in³ of an inlet zirconium component;

A useful and preferred outlet layer for Catalyst B has:
from about 40 g/ft³ to about 120 g/ft³ of an outlet platinum component;
from about 0.15 g/in³ to about 2.0 g/in³ of an outlet alumina support;
from about 0.1 g/in³ to about 0.3 g/in³ of an outlet rare earth metal oxide component (particularly ceria);
from about 0.1 g/in³ to about 0.3 g/in³ of an outlet zirconium component;
from about 0.1 g/in³ to about 0.3 g/in³ of an outlet alkaline earth metal component (particularly a strontium oxide;
from about 0.1I g/in³ to about 0.3 g/in³ of an outlet nickel oxide component;

Catalyst C

Another useful and preferred catalyst article can be a layered TWC catalyst composite having an inlet layer formed from an inlet layer composition, and an outlet layer formed from an outlet layer composition according to the coating architecture of FIG. 3. This composite contains palladium in both the inlet and outlet layer, and in specific embodiments, can comprise palladium as substantially the only precious metal. The articles can be prepared using the washcoat layer compositions described in U.S. Pat. No. 5,597,771, hereby incorporated by reference. Using the coating architecture of FIG. 3 of the instant application, the inlet and outlet layers could be formed from the first and second layer compositions disclosed in U.S. Pat. No. 5,597,771. This preferred catalyst is designated as "Catalyst C". In a preferred embodiment of Catalyst C, the coating length of each of the inlet and outlet layers is at least 90% of the axial length of the substrate.

In Catalyst C, the inlet layer comprises an inlet platinum group metal component, which comprises an inlet palladium component, which can be the same or different than that in the outlet layer. The inlet layer provides the catalyst with higher temperature conversion efficiencies, and includes an oxygen storage component in intimate contact (vide infra) with the platinum group metal. It is preferred to use an alkaline earth metal component believed to act as a stabilizer, a rare earth metal selected from lanthanum and neodymium metal components which is believed to act as a promoter, and a zirconium component. The outlet layer comprises an outlet palladium component and optionally, at least one outlet platinum group metal component other than palladium. Preferably the outlet layer additionally comprises an outlet zirconium component, at least one outlet alkaline earth metal component, and at least one outlet rare earth metal component selected from the group consisting of lanthanum metal components and neodymium metal components. Preferably, each layer contains a zirconium component, at least one of the alkaline earth metal components and a rare earth component. Most preferably, each layer includes both at least one alkaline earth metal component and at least one rare earth metal component. The inlet layer optionally further comprises an outlet oxygen storage composition which comprises an outlet oxygen storage component. The outlet oxygen storage component and/or the outlet oxygen storage composition are preferably in bulk form and also in intimate contact with the inlet platinum group metal component.

In a preferred embodiment of Catalyst C, the inlet layer can comprise an inlet palladium component and relatively minor amounts of a inlet platinum group metal other than palladium. The outlet layer can comprise an outlet palladium component and relatively minor amounts of an outlet platinum group metal component other than a palladium component. The preferred inlet and outlet platinum group components other than palladium are selected from platinum, rhodium, and mixtures thereof. The preferred inlet platinum group metal component other than palladium is platinum and the most preferred outlet platinum group metal component other than palladium is selected from rhodium, platinum, and mixtures thereof. Typically the inlet layer will contain up to 100 percent by weight of palladium as the platinum group metal. Where an inlet platinum group metal component other than palladium is used, it is used typically in amounts up to 40 and preferably from 0.1 to 40, more preferably from 5 to 25 percent by weight based on the total weight of the inlet palladium component and the platinum group metal components other than palladium in the inlet layer. Where an outlet platinum group metal component other than palladium is used, it is used typically in amounts up to 40 and preferably from 0.1 to 40, more preferably from 5 to 25 percent by weight based on the total weight of the outlet palladium component and the platinum group metal components other than palladium in the outlet layer.

Catalyst C preferably comprises a palladium component present in each of the inlet and outlet layers, in an amount sufficient to provide compositions having significantly enhanced catalytic activity due to the palladium component. In a preferred embodiment the inlet palladium component is the only platinum group metal component in the inlet layer, and the outlet palladium component is the only platinum group metal component in the outlet layer. Optionally, either or both of the inlet and outlet layers can further respectively comprise a second inlet and outlet platinum group metal component including, for instance, platinum, ruthenium, iridium and rhodium, and mixtures or alloys of such metals, e.g., platinum-rhodium.

The inlet layer composition and outlet layer composition comprise an inlet support and an outlet support, respectively, which can be the same or different components. The support is made of a high surface area refractory oxide support as recited above. The inlet layer and outlet layer compositions preferably comprise a support such as alumina, catalytic agents, stabilizers, reaction promoters and, if present, other modifiers and excludes the carrier or substrate. For typical automotive exhaust gas catalytic converters, the catalyst composite which includes a monolithic substrate generally may comprise from about 0.50 to about 6.0, preferably about 1.0 to about 5.0 g/in$^3$ of catalytic composition coating.

The catalyst preferably contains an inlet oxygen storage component, as recited above, in the inlet or bottom layer which is in intimate contact with a palladium component. The oxygen storage component is any such material known in the art and preferably is at least one oxide of a metal selected from the group consisting of rare earth metals and most preferably a cerium or praseodymium compound with the most preferred oxygen storage component being cerium oxide (ceria). The oxygen storage component can be present in at least 5 wt. % and preferably in at least 10 wt. %, and more preferably at least 15 wt. % of the inlet layer composition. In the composition of the inlet or bottom layer, the oxygen storage component can be included by dispersing methods known in the art such as by impregnating the oxygen storage component onto the palladium containing support in the form of an aqueous solution, drying and calcining the resulted mixture in air.

In the inlet layer, and in the outlet layer there is optionally an inlet bulk oxygen storage composition comprising an oxygen storage component which is preferably ceria, and/or praseodymia in bulk form as recited. It is optional that each layer contain a particular composite of zirconia and at least one rare earth oxide containing ceria, as recited above in the description of Catalyst A.

Both the inlet layer composition and outlet layer composition comprise a component which impart stabilization, preferably a inlet stabilizer in the inlet layer and outlet stabilizer in the outlet layer. The stabilizer is selected from the group consisting of alkaline earth metal compounds. Preferred compounds include compounds derived from metals selected from the group consisting of magnesium, barium, calcium and strontium. The alkaline earth metal components are preferably alkaline earth metal oxide. In a particularly preferred composition, it is desirable to use barium and strontium as the compound in the inlet and/or the outlet layer composition. The alkaline earth metal can be applied in a soluble form which upon calcining becomes the oxide. It is preferred that the soluble barium be provided as barium nitrate, barium acetate or barium hydroxide and the soluble strontium provided as strontium nitrate or strontium acetate, all of which upon calcining become the oxides.

In each of the inlet layer and outlet layer compositions, the amount of metal oxide thermal stabilizer combined with the alumina may be from about 0.05 to 30 weight percent, preferably from about 0.1 to 25 weight percent, based on the total weight of the combined alumina, stabilizer and catalytic metal component.

Additionally, both the inlet layer composition and the outlet layer composition contain a compound derived from zirconium, preferably zirconium oxide. The zirconium compound can be provided as a water soluble compound such as zirconium acetate or as a relatively insoluble compound such as zirconium hydroxide. There should be an amount sufficient to enhance the stabilization and promotion of the respective compositions.

Both the inlet layer composition and the outlet layer composition contain at least one inlet promoter selected from the group consisting of lanthanum metal components and neodymium metal components with the preferred components being lanthanum oxide (lanthana) and neodymium oxide (neodymia). In a particularly preferred composition, there is lanthana and optionally a minor amount of neodymia in the inlet layer, and neodymia or optionally lanthana in the outlet layer. While these compounds are known to act as stabilizers for the alumina support, their primary purpose in the composition of the present invention is to act as reaction promoters for the respective inlet and outlet layer compositions.

The inlet layer composition and/or the outlet layer composition of the present invention can contain other conventional additives such as sulfide suppressants, e.g., nickel or iron components. If nickel oxide is used, an amount from about 1 to 25% by weight of the inlet coat can be effective.

A particularly useful embodiment of Catalyst C comprises in the inlet layer from about 0.003 to 0.3 g/in³ of the inlet palladium component; from about 0 to 0.065 g/in³ of the inlet platinum group metal component other than palladium; from about 0.15 to about 2.0 g/in³ of the inlet support, i.e., alumina; at least about 0.05 g/in³ of the total inlet oxygen storage component in intimate contact with the palladium component; from about 0.025 to about 0.5 g/in³ of at least one inlet alkaline earth metal components; from about 0.025 to about 0.5 g/in³ of the inlet zirconium component; from about 0.025 to about 0.5 g/in³ of at least one inlet rare earth metal component selected from the group consisting of lanthanum metal components and neodymium metal components; and comprises in the outlet layer from about 0.003 to 0.3 g/in³ of the outlet palladium component and from about 0 to 0.065 g/in³ of an outlet rhodium component or an outlet platinum component or mixture thereof, from about 0.15 g/in³ to about 2.0 g/in³ of the outlet support, i.e., alumina; and from about 0.025 to about 0.5 g/in³ of the outlet zirconium component. The inlet and/or outlet layers can further comprise from about 0.025 g/in³ to about 0.5 g/in³ of a nickel component. The inlet and/or outlet layers further can include the particulate composite of zirconia and ceria in amounts from 0.0 to 2.0 g/in³ comprising 60 to 90 wt. % zirconia, 10 to 30 wt. % ceria and from 0 to 10 wt % rare earth oxides comprising lanthana, neodymia and mixtures thereof.

A useful and preferred inlet layer of Catalyst C has:
  from about 0.003 to about 0.6 g/in³ of at least one palladium component;
  from 0 to about 0.065 g/in³ of at least one inlet platinum and/or inlet rhodium component;
  from about 0.15 to about 2.0 g/in³ of an inlet support;
  from about 0.05 to about 2.0 g/in³ of the total of the inlet oxygen storage components in the inlet layer;
  from 0.0 and preferably about 0.025 to about 0.5 g/in³ of at least one inlet alkaline earth metal component;
  from 0.0 and preferably about 0.025 to about 0.5 g/in³ of an inlet zirconium component; and
  from 0.0 and preferably about 0.025 to about 0.5 g/in³ of at least one inlet rare earth metal component selected from the group consisting of ceria metal components, lanthanum metal components and neodymium metal component.

A useful and preferred outlet layer of Catalyst C has:
  from about 0.003 g/in³ to about 0.6 g/in³ of at least one outlet palladium component;
  from 0.0 g/in³ to about 0.065 g/in³ of at least one inlet platinum and/or rhodium component;
  from about 0.15 g/in³ to about 2.0 g/in³ of an outlet support;
  from 0.0 and preferably about 0.025 g/in³ to about 0.5 g/in³ of at least one outlet rare earth metal component selected from the group consisting of lanthanum metal components and neodymium metal components;
  from 0.0 and preferably about 0.25 g/in³ to about 0.5 g/in³ of at least one outlet alkaline earth metal component; and
  from 0.0 and preferably about 0.025 to about 0.5 g/in³ of an outlet zirconium component. However, the inlet layer requires an alkaline earth metal component and/or a rare earth component, and the outlet layer requires an alkaline earth metal component and/or a rare earth metal component.

The inlet and/or outlet layers can have from 0.0 to about 2.0 g/in³ of an oxygen storage composite comprising a particulate form of ceria-zirconia composite.

Multi-Zone Catalyst with Second Inlet/Outlet Layer

Figure 5:
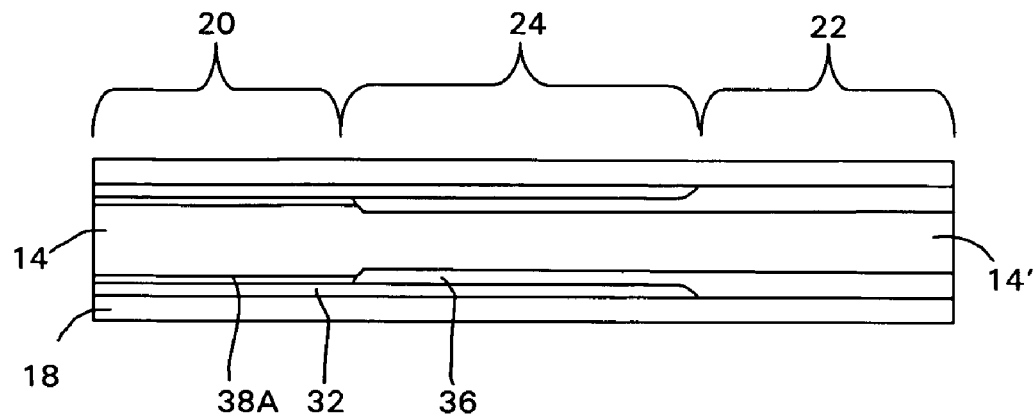
Figure 6:
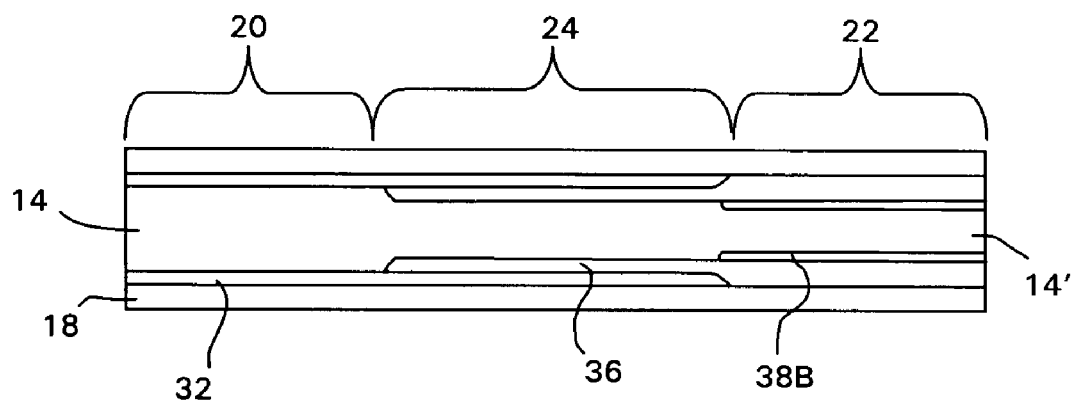

The multi-zone coating architectures depicted in FIGS. 5 and 6 illustrate other options for the efficient utilization of the platinum group metal according to another embodiment of the invention. In this embodiment there is provided a three-layered multi-zoned catalyst formed on a monolith substrate carrier. The catalysts of this embodiment include first inlet (32) and first outlet (36) layers having a coating architecture similar to the inlet and outlet layers in FIG. 3. In addition, a short segment of a second layer (38) is also deposited on the catalysts. In one coating architecture depicted in FIG. 5, the second layer is a second inlet layer (38A) that overlies at least part of the first inlet layer (32), beginning at the inlet axial end (14) and extending for a length of up to 50% of the wall elements' length. In another architecture depicted in FIG. 6, the second layer is a second outlet layer (38B), that overlies at least part of the first outlet layer (36), beginning at the outlet axial end (14') and extending for a length of up to 95% of the wall elements' length.

This embodiment provides another option for improved placement of the platinum group metal components along the length of the monolith substrate. The first inlet and outlet layers in this embodiment have a reduced coating length as compared to a conventional bilayer catalyst. For catalysts prepared on substrates of the same dimensions with identical washcoat compositions, there is a savings in platinum group metal usage associated with a catalyst coated with the first inlet and outlet layers as compared to the conventional bilayer catalyst due to the reduced coating lengths of the first inlet and outlet layers. In this embodiment, the conserved platinum group metal can be deposited in a short segment of washcoat composition, comprising the second layer (38), at either the inlet or outlet end of the substrate.

In this embodiment, the first inlet layer can be formed from a washcoat that contains catalytic agents such as platinum group metal components supported on refractory oxide supports to provide a catalyst layer. Alternatively, the first inlet layer, formed from pollutant absorbent material, can function as a trap layer. The trap material can be, for example, an absorbent that specifically absorbs nitrogen oxides, hydrocarbon, or sulfur-containing pollutants. A number of known suitable hydrocarbon traps can be used, for example, such as the zeolite trap materials disclosed in U.S. Pat. No. 6,074,973, hereby incorporated by reference. Known absorbents for nitrogen oxides include alkaline earth metal oxides. Known sulfur trapping material include base metal oxides such as bulk nickel oxide.

The second layer (38) is a layer consisting essentially of a high concentration of platinum group metal components and a refractory oxide support. Preferably, there is at least 20 g/ft³ of platinum group metal deposited in the zone defined by the second inlet or outlet layer. In some embodiments higher platinum group metal loadings are preferred. The second layer is preferably thin, and is formed from a washcoat composition of low viscosity. The refractory oxide support in the second layer is present in an amount of about 0.05 to about 0.5 g/in³, preferably in an amount from 0.1 to about 0.35 g/in³, more preferably in an amount from 0.15 g/in³ to about 0.25 g/in³. The combination of a thin catalyst washcoat with a high platinum group metal concentration can result in a zone that contributes to enhanced combustion of a particular component of the exhaust.

Catalyst D

A preferred catalyst having the coating architecture of FIG. 5, illustrates the desirability of including a second inlet layer (38A) at the inlet end of the substrate to provide a catalyst with a zone (20) with enhanced low temperature hydrocarbon combustion activity (designated herein as "Catalyst D"). The second inlet layer is formed from a low viscosity catalyst washcoat containing palladium or a combination of palladium/platinum components. Each of the first inlet and first outlet layers of this preferred catalyst can be prepared from the inlet and outlet layer compositions, respectively, described above for the Catalyst A. As such, the first inlet layer contains a first inlet palladium component and optionally a first inlet platinum component, and the first outlet layer contains a first outlet platinum component and a first outlet rhodium component.

In one preferred embodiment of Catalyst D, the first inlet and first outlet layers each extend to a length of at least 60% of the substrate's axial length. The second inlet layer has a length of less than 50% of the substrate's axial length. More preferably, the length of the second inlet layer is about 30-40% of substrate's axial length.

The second inlet layer is formed from a second inlet washcoat composition containing a second inlet support, e.g., alumina, and a second inlet palladium component and optionally a second inlet platinum component.

In Catalyst D, a useful and preferred first inlet layer has (recited as grams per coated substrate volume):
  from about 0.0175 to about 0.3 g/in$^3$ of palladium component;
  from about 0 to about 0.065 g/in$^3$ of a first inlet platinum component;
  from about 0.15 to about 2.0 g/in$^3$ of a first inlet support;
  from about 0.025 to about 0.5 g/in$^3$ of at least one first inlet alkaline earth metal component;
  from about 0.025 to about 0.5 g/in$^3$ of a first inlet zirconium component; and
  from about 0.025 to about 0.5 g/in$^3$ of at least one first rare earth metal component selected from the group consisting of ceria metal components, lanthanum metal components and neodymium metal component.

In Catalyst D, a useful and preferred first outlet layer has:
  from about 0.001 g/in$^3$ to about 0.03 g/in$^3$ of a first outlet rhodium component;
  from about 0.001 g/in$^3$ to about 0.15 g/in$^3$ of first outlet platinum component;
  from about 0.15 g/in$^3$ to about 1.5 g/in$^3$ of first outlet support;
  from about 0.1 to 2.0 g/in$^3$ of a first outlet oxygen storage composition;
  from about 0.025 g/in$^3$ to about 0.5 g/in$^3$ of at least first outlet rare earth metal component selected from the group consisting of lanthanum metal components and neodymium metal components; and
  from about 0.025 to about 0.5 g/in$^3$ of a first outlet zirconium component.

In Catalyst D, a useful and preferred second inlet layer has:
  from about 50 to about 350 g/ft$^3$ of second inlet palladium component; and
  from about 0.1 to about 1.5 g/in$^3$ of a second inlet support.

Using an alternative coating architecture as depicted in FIG. 6, the placement of the second layer at the outlet end can provide the catalyst with a downstream zone (22) that provides enhanced combustion of a particular component of the exhaust, e.g., hydrocarbons or nitrogen oxides. The second outlet layer is formed from a low viscosity washcoat containing a high concentration of platinum group metal components as compared to the first inlet and outlet layers. As a result of the coating architecture, higher quantities of platinum group metal components are provided in the downstream and intermediate zones as compared to a conventional bilayer catalyst, with comparably less platinum group metal in the upstream zone (20). The upstream zone (20) of FIG. 6 architecture can be viewed as a "sacrificial zone" where phosphorus and lead deposits form which would otherwise coat costly platinum group metal catalytic agents and render them less catalytically effective. Phosphorus and zinc deposits in the engine exhaust result from engine oil that contain phosphorus and zinc-containing lubricants that leak past piston rings. The oil burns and can be deposited on the catalyst surface. This environment can occur in exhaust systems of motor vehicles that consume significant quantities of motor oil, typically older vehicles. Likewise, lead contaminants derived from residual lead in fuel can also coat catalyst surfaces and poison the catalytic agents.

For example, to prepare a catalyst with a downstream zone (22) that provides enhanced oxidation of hydrocarbons, the second inlet zone is prepared with a washcoat composition containing palladium or a combination of platinum and palladium components. The total concentration of platinum group metal in the second outlet layer preferably is at least 80 g/ft$^3$. In some embodiments, an undercoat (40) comprising a layer of hydrocarbon trapping material is deposited below the first inlet and outlet layers on the channel walls of the substrate according to the coating architecture of FIG. 7. In this configuration, the undercoat of hydrocarbon trapping material can trap the hydrocarbons during periods when the exhaust is cool (e.g., during engine startup). As the exhaust temperature rises, the trapped hydrocarbons can be released and oxidized in the downstream zone. The downstream zone can be viewed as a "burn-off zone" for the enhanced combustion of hydrocarbons. The inclusion of the hydrocarbon trap in the catalyst has the effect of widening the temperature window for the effective combustion of the hydrocarbons.

The hydrocarbon trapping layer can be formed from a washcoat containing trapping materials as described in U.S. Pat. No. 6,074,973 ("the '973 patent"), hereby incorporated by reference. Briefly, the trap material disclosed in the '973 patent is composed of palladium and silver dispersed on a high surface area metal oxide support and a zeolite material such as one or more of ZSM-5, Beta, Y and other suitable zeolites. The trap material is efficiently made by combining in a single vessel the zeolite, the metal oxide support, and aqueous solutions of a palladium compound and a silver compound.

In other embodiments of the catalyst having the coating architecture according to FIG. 6, the second outlet zone is prepared with a washcoat composition containing a combination of platinum and rhodium components. This configuration provides the catalyst with a downstream zone (22) effective for the enhanced reduction of nitrogen oxides (NOx). The total concentration of platinum group metal in the second outlet layer preferably is at least 20 g/ft$^3$. Similar to the embodiment described above, an undercoat (40) comprising a layer of nitrogen oxide trapping material is optionally disposed on the channel walls of the substrate, below the first inlet and outlet layers as depicted in the coating architecture of FIG. 7.

The undercoat can be formed from nitrogen oxides absorbent materials such as those disclosed in U.S. Pat. No. 6,105,365 ("the '365 patent"), hereby incorporated by reference. This reference discloses use of suitable NOx adsorption materials that include but are not limited to metal oxides, metal carbonates, metal hydroxides, and mixed metal oxides. Suitable metals for the oxides, carbonates, and hydroxides include but are not limited to Group IA and Group IIA metals.

Preferred of these metals are lithium, sodium, potassium, cesium, magnesium, calcium, strontium, and barium; most preferred are lithium, barium, and strontium. Other preferred metals are lanthanum and manganese.

Examples of useful metal oxides are strontium oxide (SrO), barium oxide (BaO), calcium oxide (CaO), cesium oxide ($Cs_2O$), lithium oxide (LiO), lanthanum oxide ($La_2O_3$), potassium oxide ($K_2O$), magnesium oxide (MgO), manganese oxide ($MnO_2$), and sodium oxide ($Na_2O$). Preferred are $MnO_2$, BaO and SrO.

Examples of useful mixed oxides are $BaTiO_3$, $BaZrO_3$, $LaZrO_2$, MnO, $LaMnO_{x'}$ (where x' is an integer from 2 to 4) and perovskite and spinal type mixed oxides. Also useful are mixed oxides containing $La_2O_3$, $CeO_2$ with metal oxides such as $TiO_2$, $ZrO_2$, $MnO_2$, BaO, and SrO. Preferred mixed oxides are those containing $ZrO_2$, $MnO_2$, BaO, and SrO.

Figure 7:
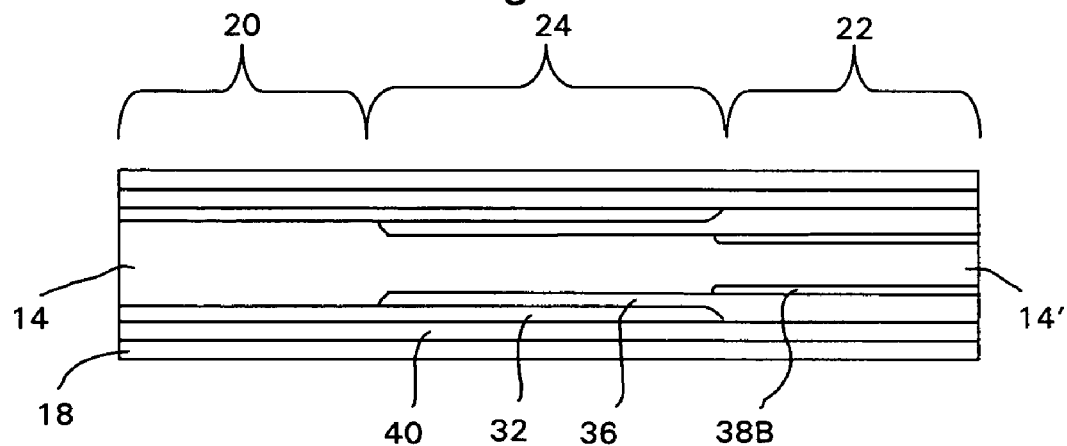

Using configuration such as that exemplified in FIG. 7, the nitrogen oxides can be trapped during periods when the exhaust gas composition is lean of stoichiometric, and then released when the exhaust gas composition becomes rich. The released nitrogen oxides can then be treated in the downstream zone (22) where the exhaust gas is contacted with higher concentration of platinum group metals effective for the treatment of nitrogen oxides. The inclusion of the nitrogen oxides trapping undercoat in combination with the downstream zone effectively minimizes the nitrogen oxides emissions.

Preparation of Washcoat Compositions and Coating of Substrates

Preferred catalyst washcoat compositions contain platinum group metal components as catalytic agents and a support of a refractory metal oxide such as activated alumina. Some catalyst washcoat compositions contain oxygen storage components and zirconia components. In addition, each catalytic composition can optionally contain an alkaline earth metal as a stabilizer, an iron or nickel component as a sulfide suppressing agent, and a rare earth metal component selected from the group consisting of lanthanum or neodymium components as a promoter.

As will be apparent to those of ordinary skill in the art, the platinum group metal components, acting as catalytic agents, can exist in the catalyst in multiple oxidation states while in use. By way of example, a palladium component can exist as palladium metal, Pd (II), and Pd(IV) in the catalyst. In a preferred method of preparing the catalyst, a platinum group metal component such as a suitable compound and/or complex of the platinum group metals can be utilized to achieve dispersion of the catalytic component on a support, e.g., activated alumina support particles. As used herein, the term "platinum group metal component" means any platinum group metal compound, complex, or the like which, upon calcination or use of the catalyst decomposes or otherwise converts to a catalytically active form, usually, the metal or the metal oxide. Water soluble compounds or water dispersible compounds or complexes of platinum group metals can be utilized as long as the liquid used to impregnate or deposit the catalytic metal compounds onto support particles does not adversely react with the catalytic metal or its compound or complex or the other components of the catalyst composition and is capable of being removed from the catalyst by volatilization or decomposition upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds of the platinum group metals are preferred. For example, suitable compounds are chloroplatinic acid, amine solubilized platinum hydroxide, palladium nitrate or palladium chloride, rhodium chloride, rhodium nitrate, hexamine rhodium chloride, and the like. During the calcination step, or at least during the initial phase of use of the catalyst, such compounds are converted into a catalytically active form of the platinum group metal or a compound thereof.

Useful catalytic supports can be made of high surface area refractory oxide supports. Useful high surface area supports include one or more refractory oxides selected from alumina, titania, silica and zirconia. These oxides include, for example, silica and metal oxides such as alumina, including mixed oxide forms such as silica-alumina, aluminosilicates which may be amorphous or crystalline, alumina-zirconia, alumina-chromia, alumina-ceria and the like. The support is substantially comprised of alumina which preferably includes the members of the gamma or activated alumina family, such as gamma and eta aluminas, and, if present, a minor amount of other refractory oxide, e.g., about up to 20 weight percent. Preferably, the activated alumina has a specific surface area of 60 to 300 $m^2/g$.

Preferred oxygen storage components in the catalytic composition have oxygen storage and release capabilities. The oxygen storage component is any such material known in the art, preferably at least one oxide of a metal selected from the group consisting of rare earth metals, and most preferably a cerium or praseodymium compound. Cerium oxide and praseodymium oxide are preferred oxygen storage components with cerium oxide (ceria) being most preferred.

The oxygen storage component can be included in the catalyst washcoats by dispersing methods known in the art. One method includes impregnation onto the composition by impregnating the oxygen storage component onto the support such as a platinum group metal containing support in the form of an aqueous solution, drying and calcining the resulting mixture in air to give a catalyst layer which that contains an oxide of the oxygen storage component in intimate contact with the catalytic agent. Examples of water soluble or dispersible, decomposable oxygen storage components that can be used include, but are not limited to water soluble salts and/or colloidal dispersions of cerium acetate, praseodymium acetate, cerium nitrate, praseodymium nitrate, etc. U.S. Pat. No. 4,189,404 discloses the impregnation of alumina-based support composition with cerium nitrate.

In another method, the oxygen storage component in the catalyst washcoat composition can be a bulk oxygen storage composition comprising an oxygen storage component which is preferably ceria, and/or praseodymia in bulk form. Ceria is most preferred. A preferred bulk oxygen storage component includes a co-precipitated ceria-zirconia composite.

Additionally, the catalyst washcoat composition can contain a compound derived from zirconium, preferably zirconium oxide. The zirconium compound can be provided as a water soluble compound such as zirconium acetate or as a relatively insoluble compound such as zirconium hydroxide, both of which upon calcining are converted to the oxide. There should be an amount sufficient to enhance the stabilization and promotion of the catalyst washcoat compositions.

Stabilizers can be included in the catalyst washcoat compositions. Stabilizers can be selected from at least one alkaline earth metal component derived from a metal selected from the group consisting of magnesium, barium, calcium and strontium, preferably strontium and barium. The alkaline earth metal can be applied in a soluble form (i.e., as a water-soluble salt) which upon calcining becomes the oxide.

The catalyst washcoat compositions optionally contain at least one promoter selected from the group consisting of lanthanum metal components and neodymium metal components with the preferred components being lanthanum oxide (lanthana) and neodymium oxide (neodymia).

The lanthanum and/or neodymium components are preferably formed from precursors, such as soluble salts including acetates, halides, nitrates, sulfates and the like. The solution of the soluble promoters are preferably used to impregnate the solid components for their conversion to oxides after calcination. Preferably the promoter is in intimate contact with other components in the composition including and in particular, the platinum group metal component.

The catalyst layer compositions of the present invention can contain other conventional additives such as sulfide suppressants, e.g., nickel or iron components. Nickel oxide is a preferred sulfide suppressant and if used is present in an amount from about 1 to 25% by weight of the base metal undercoat.

The catalyst washcoats of the present invention can be made by any suitable method. One preferred method includes preparing a mixture of at least one water-soluble or dispersible, platinum group metal component and a finely-divided, high surface area, refractory oxide which is sufficiently dry to absorb essentially all of the solution to form a supported platinum group metal component. If more than one platinum group metal component is used in the catalyst washcoat composition, the additional platinum group metal component(s), can be supported on the same or different refractory oxide particles as the first platinum group metal component.

The supported platinum group metal component or plurality of such supported platinum group metal components are then added to water along with other additives, and comminuted by a ball mill or other suitable equipment to form a slurry. Preferably, the slurry is acidic, having a pH of less than 7 and preferably from 3 to 7. The pH is preferably lowered by the addition of an acid, preferably acetic acid to the slurry. In preferred embodiments, the catalyst washcoat slurry is comminuted to result in substantially all of the solids having particle sizes of less than 10 or 15 micrometers in average diameter. At this point stabilizing components such as barium and strontium acetate, and promoting components including lanthanum acetate can be added and the composition is milled further. The catalyst washcoat slurry can be formed into a catalyst layer on a suitable carrier. The platinum group components and as well additives provided in soluble form, e.g., oxygen storage components, zirconium components and promoters, in the catalyst layer are converted to a water insoluble form chemically or by calcining. The catalyst layers are preferably calcined, preferably at temperatures of at least 250° C.

Alternatively, each layer can also be prepared by the method disclosed in U.S. Pat. No. 4,134,860 (hereby incorporated by reference) generally recited as follows.

A finely-divided, high surface area, refractory oxide support is contacted with a solution of a water-soluble, platinum group metal component to provide a mixture which is essentially devoid of free or unabsorbed liquid. The platinum group metal component of the solid, finely-divided mixture can be converted at this point in the process into an essentially water-insoluble form while the mixture remains essentially free of unabsorbed liquid. This process can be accomplished by employing a refractory oxide support, e.g., alumina, including stabilized aluminas, which is sufficiently dry to absorb essentially all of the solution containing the platinum group metal component, i.e., the amounts of the solution and the support, as well as the moisture content of the latter, are such that their mixture has an essential absence of free or unabsorbed solution when the addition of the platinum group metal component is complete. During the latter conversion or fixing of the catalytically-promoting metal component on the support, the composite remains essentially dry, i.e., it has substantially no separate or free liquid phase.

The substrate (carrier) used in the invention is preferably a monolithic carrier of the type having a plurality of fine, parallel gas flow passages extending therethrough from an inlet or an outlet face of the carrier, so that the passages are open to fluid flow therethrough (also known as honeycomb carriers). The passages, which are essentially straight from their fluid inlet to their fluid outlet, are defined by walls. The flow passages of the monolithic carrier are thin-walled channels which can be of any suitable cross-sectional shape and size, such as trapezoidal, rectangular, square, sinusoidal, hexagonal, oval or circular. Such structures can contain from about 60 to about 900 or more gas inlet openings ("cells") per square inch of cross section. Carriers can be of the ceramic type or of the metallic type.

Ceramic substrates (carriers) can be made of any suitable refractory material, for example, cordierite, cordierite-alpha alumina, silicon nitride, zircon mullite, spodumene, alumina-silica magnesia, zircon silicate, sillimanite, magnesium silicates, zircon, petalite, alpha alumina and aluminosilicates. Metallic carriers can be made of a refractory metal such as a stainless steel or other suitable iron based corrosion resistant alloys.

The three zone bilayer catalysts having the coating architecture according to FIGS. 3 and 4 are advantageously prepared in an efficient procedure that reduces manufacturing time and costs. In the process, a carrier, preferably a monolith carrier, is prepared using two coating steps and one calcination step. The omission of a separate calcination step, as is typically needed in the preparation of conventional multi-layer catalysts, between the coating of the inlet and outlet layers results in a more efficient procedure. The process is preferably carried out using a metered charge coating device as described in U.S. Pat. No. 4,609,563; hereby incorporated by reference.

Figure 8:
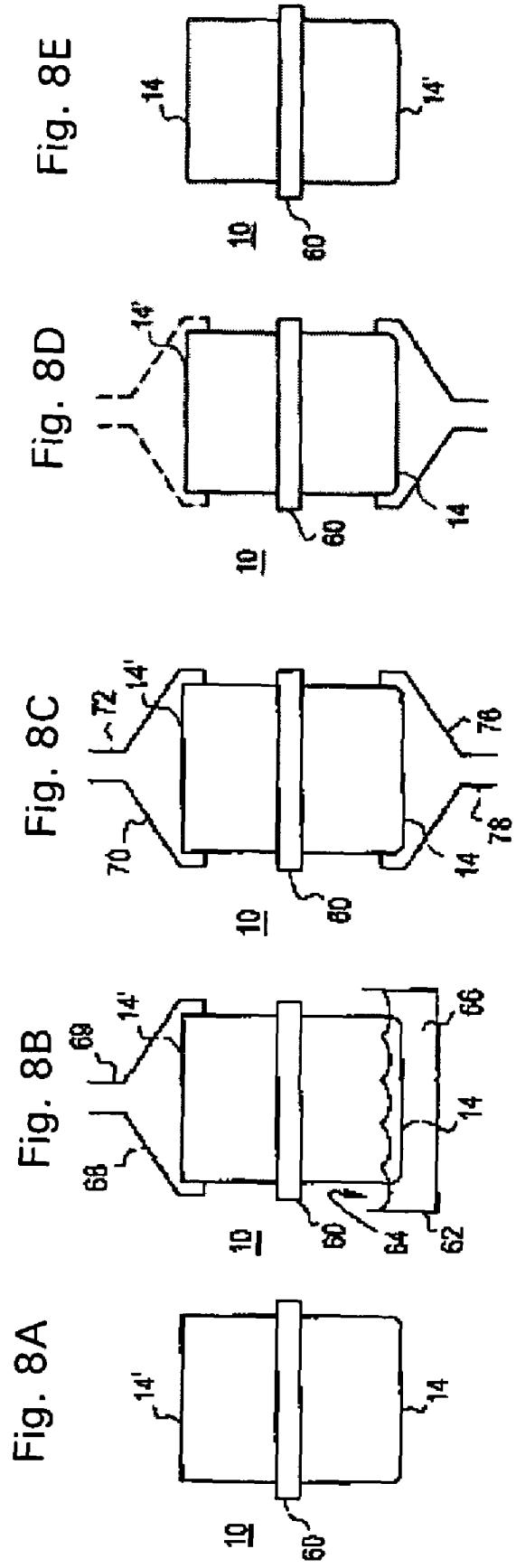
FIG. 8 is a schematic flow chart illustrating a method of preparing the zoned catalyst architectures of the present invention.

FIG. 8 is a schematic flow chart illustrating the various steps A through E in an embodiment of the present invention. Common elements in FIG. 8 and various other Figures have the same reference characters. The method of the present invention is useful for a continuous production.

In Step A (FIG. 8A), honeycombs (10) are continuously fed into an apparatus for coating. The honeycomb is retained by a suitable retaining means such as clamp (60). The honeycomb (10) may be weighed before coating. The honeycomb proceeds from Step A to Step B (FIG. 8B). In Step B honeycomb (10) is immersed in a vessel such a dip pan (62) having a region in the form of a reservoir (64) containing a coating media (66) (washcoat composition). A suitable means is used to apply a vacuum to the top or outlet axial end (14') of honeycomb (10). Preferably, hood (68) is sealingly applied to the top or outlet axial end (14') of honeycomb (10) and a vacuum is applied by a suitable vacuum means, such as a vacuum pump (not shown) through conduit 69 to the top end 14' of the honeycomb 10 to create a pressure drop and thereby draw the coating media 66 from the reservoir 64 into the bottom or inlet axial end 14 of the honeycomb 10 so as to coat the channels 16 at least over a portion of their length. This coating is conducted in the manner disclosed in U.S. Pat. No. 5,953,832, hereby incorporated by reference. To apply the coating for only part of the channel length, there is a limited amount of fluid (coating media) in the reservoir. When the fluid is all removed it coats a predetermined length and air is sucked into the channel. The front edge of the fluid which had filled the channels breaks and there is an open path from the inlet to the outlet. The composition forms a coating length on the wall up to the predetermined length. In Step B, the vacuum applied can be from 5 to 15 and typically 5 to 10 inches of water. The coating step takes place from 1 to 10 seconds and preferably 2 to 4 seconds.

The coating applied in Step B is then dried in accordance with Step C (FIG. 8C). A useful description of the drying step is described in the referenced U.S. Pat. No. 5,953,832. Step C is an operative engagement of the vacuum apparatus for pulling vapors through the substrate and a blowing device for forcing gas (e.g., heated air) through the substrate in order to dry the coating. The honeycomb 10 continues to be retained by a suitable retaining means such as clamp 60 during the drying operation. A suitable means is used to apply a vacuum to the top or outlet axial end 14' of honeycomb 10. Preferably, hood 68 can continue to be applied or a new hood 70 is sealingly applied to the top or outlet axial end 14' of honeycomb 10 and a vacuum is applied by a suitable vacuum means, such as a vacuum pump (not shown) through conduit 72 to the top end or outlet axial end 14' of the honeycomb 10. There is a means for forcing or pushing a gas (e.g., hot air) into the channels 16 of the honeycomb. The apparatus includes a hood 76 which has means to be sealingly applied to the bottom or inlet axial end 14 of honeycomb 10.

In the operation of Step C, a vacuum is generated by a suitable vacuum generating device to draw gas from the top or outlet axial end 14' through conduit 72. A blower (not shown) or suitable device is activated to force a hot gas into conduit 78 and into the bottom or inlet axial end 14 of honeycomb 10. Accordingly, vapors are drawn from the honeycomb 10 outlet 14' through hood 70 and out conduit 72, while hot air is forced upwardly through conduit 78 into the hood 76 and up into the bottom or inlet axial end 14 of honeycomb 10. As a consequence, vapors within the channels 16 of the honeycomb 10 are drawn out of the channels and hot gas is forced through the channels of honeycomb to dry the coating.

The intensity of the vacuum imposed during the drying step can vary depending upon the cross-sectional areas of the channels 16, the composition and thickness of the coating media applied to each channel. Generally, the intensity of the vacuum will be in the range of from about 5 to about 15 inches of water. A device for imposing a vacuum can be, for example, a Paxton Blower. The hot blowing gas system can be in the form of jet air kerosene heater having a heating capacity of, for example, about 50,000 BTU. In operation, once the substrate is removed from the reservoir of the coating media in Step B, the vacuum draws the vaporized constituents from the channels at a vacuum of from about 5 to 15 inches of water, for typically from 2 to 40 seconds, preferably 2 to 10 seconds, and most preferably 2 to 6 seconds. The vacuum is maintained until the vapors are dissipated. During or after imposition of the vacuum, the hot gas generating system can generate a hot gas (e.g., hot air) at a suitable temperature (e.g., from about 75° to 400° C., most typically from 75° to 200° C.) and at a suitable flow rate to hasten drying of the layer.

The coated and dried honeycomb from Step C next goes to Step D (FIG. 8D) where air at ambient temperature is applied from 2 to 20 seconds and preferably 5 to 20 seconds and preferably about 8 seconds in order to cool the coating as quickly as possible. This completes a coating step for a layer in the present invention. The ambient air is typically at a temperature range of from 5° to 40° C. Other gases, preferably inert gases, can be used aside from air for the cooling step. Preferably, there is a hood such as hood 70 at the outlet 14'.

An outlet layer coating can be provided by rotating the honeycomb 10 in Step E (FIG. 8E) so that the outlet axial end 14' becomes the bottom end and the inlet axial end 14 becomes the top end to put coating through the outlet side. The process can be repeated to create the coating architectures of FIGS. 3 and 4 on the coated honeycomb.

Preferably the substrate is calcined after the completion of the coating and drying of both the inlet and outlet layers on the substrate. The calcining can be conducted at from 250° C. to 900° C. at from 0.1 to 10 hours and preferably from 450° C. to 750° C. at from 0.5 to 2 hours.

To prepare a substrate having either a second inlet or outlet layer according to the coating architecture depicted in FIGS. 5-7, additional processing steps are conducted. The coated and calcined substrate from above is coated with a volume of a low viscosity washcoat slurry containing a high concentration of precious metal component and a support, e.g., activated alumina, to form a either a thin second inlet or outlet layer. The low viscosity slurry is preferably deposited by drawing the slurry through the substrate channels by capillary action. Here again, the volume of the coating slurry can be used to control the coating length of the first and second inlet layers. Preferably, the coating length of the second inlet or outlet layer is less than 50% of the axial length of the substrate, more preferably about 30-40% of the axial length. After coating with the second inlet or outlet layers, the substrate can be dried and calcined.

The low viscosity washcoat slurry can be prepared by impregnating alumina with an aqueous solution of a palladium salt, e.g., palladium nitrate. The impregnated alumina particles are then milled with a suitable binder to until substantially all of the solids have particle sizes of less than 10 micrometers in average diameter. The resulting washcoat slurry to be applied has a solids content of about 40%.

The following examples further illustrate the present invention, but of course, should not be construed as in any way limiting its scope.

EXAMPLE 1

Preparation of a Three Zone Bilayer Catalyst Having an Inlet and Outlet Layers Containing Palladium (Exemplifies the Preparation of Catalyst C)

A. Inlet Layer

A washcoat composition was prepared similarly to the preparation of the first coat in Example 1 of U.S. Pat. No. 5,597,771 to form a washcoat layering slurry containing about 40 percent by weight of solids. One axial end of a monolith substrate (3.15×4.75×2.98 in, oval) of cordierite containing about 400 flow passages per square inch of cross section was dipped into the washcoat slurry at a depth sufficient to coat 90% of the axial length of the substrate. The excess was blown off the monolith by compressed air. The resultant coated monolith after being calcined at 450° C. contained 38 g/ft$^3$ palladium, 0.53 g/in$^3$ alumina, 0.15 g/in$^3$ of cordierite, 0.26 g/in$^3$ of ceria-zirconia composite, 0.62 g/in$^3$ $CeO_2$, 0.09 g/in$^3$ $La_2O_3$, 0.06 g/in$^3$ $Nd_2O_3$, 0.20 g/in$^3$ $ZrO_2$, 0.09 g/in$^3$ BaO, and 0.09 g/in$^3$ NiO (washcoat component concentration expressed as grams per total substrate volume).

B. Outlet Layer

A washcoat composition was prepared similarly to the preparation of the second coat of Example 1 of U.S. Pat. No. 5,597,771 to form a washcoat layering slurry containing about 40 percent by weight of solids. The monolith coated with the inlet layer in Part A of this Example was dipped in the outlet layer slurry. The substrate introduced into the outlet layer slurry from the opposite axial end that was coated with inlet layer slurry. The substrate was dipped to a depth sufficient to coat 90% of the axial length of the substrate. After blowing off the excess, drying and calcining, the monolith picked up an additional 1.34 g of washcoat containing 72 g/ft$^3$ of palladium, 0.70 g/in$^3$ of alumina, 0.20 g/in$^3$ of ceria-zirconia composite, 0.10 g/in$^3$ of ZrO$_2$, 0.10 g/in$^3$ of La$_2$O$_3$, 0.10 g/in$^3$ of Nd$_2$O$_3$, and 0.10 g/in$^3$ of SrO. The final coated monolith substrate contained 110 g/ft$^3$ of palladium (washcoat component concentration expressed as grams per total substrate volume). This coated monolith substrate is designated Catalyst C1a.

A second catalyst (designated as Catalyst C1) was prepared using the procedure recited above adjusting the amount of palladium nitrate added so that the final monolith substrate contained 200 g/ft$^3$ of palladium (80 g/ft$^3$ after coating the inlet layer and an additional 120 g/ft$^3$ after coating of the outlet layer).

EXAMPLE 2

(Comparative Example) Preparation of a Conventional Bilayer Catalyst Having a Substrate Containing Palladium in both Top and Bottom Coats A. First Layer The first (bottom) coat of this catalyst was formed using the slurry used to prepare the inlet layer in Example 1. The entire axial length of a 400 cpsi cordierite monolith substrate of the same dimensions used in Example 1 was coated with the slurry. The excess was blown off the monolith by compressed air. The resultant coated monolith after being calcined at 450° C. contained 38 g/ft$^3$ palladium, 0.53 g/in$^3$ alumina, 0.15 g/in$^3$ of cordierite, 0.26 g/in$^3$ of ceria-zirconia composite, 0.62 g/in$^3$ CeO$_2$, 0.09 g/in$^3$ La2O$_3$, 0.06 g/in$^3$ Nd$_2$O$_3$, 0.20 g/in$^3$ ZrO$_2$, 0.09 g/in$^3$ BaO, and 0.09 g/in$^3$ NiO (washcoat component concentration expressed as grams per total substrate volume).

B. Second Layer

A washcoat composition was prepared by was prepared similarly to the Second Coat of Example 1, of U.S. Pat. No. 5,597,771 to form a washcoat layering slurry containing about 40 percent by weight of solids. The monolith coated with the inlet layer in Part A of the Example was dipped in the second layer slurry to coat the entire axial length of the substrate. After blowing off the excess, drying and calcining, the monolith picked up an additional 1.4 g of washcoat containing 72 g/ft$^3$ of palladium, 0.70 g/in$^3$ of alumina, 0.20 g/in$^3$ of ceria-zirconia composite, 0.10 g/in$^3$ of ZrO$_2$, 0.10 g/in$^3$ of La$_2$O$_3$, 0.10 g/in$^3$ of Nd$_2$O$_3$, and 0.10 g/in$^3$ of SrO. The final coated monolith substrate contained 110 g/ft$^3$ of palladium (washcoat component concentration expressed as grams per total substrate volume). This catalyst sample is designated as Catalyst E1a.

A second catalyst (designated as Catalyst E1) was prepared using the procedure recited above adjusting the amount of palladium nitrate added so that the final monolith substrate contained 200 g/ft$^3$ of palladium (80 g/ft$^3$ after coating the first layer and an additional 120 g/ft$^3$ after coating of the second layer.)

EXAMPLE 3

Preparation of a Three Zone Bilayer Catalyst Having an Outlet Layer Containing Pd and Inlet Layer Containing Rhodium (Exemplifies the Preparation of Catalyst B with the Coating Architecture According to FIG. 4)

A. Outlet Layer

A washcoat composition was prepared by impregnating a portion of gamma alumina powder having a BET surface area of 150 m$^2$/g with an aqueous solution of palladium nitrate. The palladium-containing alumina was combined with cerium nitrate, zirconium acetate, strontium nitrate, acetic acid (as a dispersant) and water in a ball-mill to form a slurry. Milled NiO was added to the slurry and the milling was continued to form the outlet layer slurry containing about 40 percent by weight of solids. One axial end of a monolith substrate (3.15×4.75×2.98 in, oval) of cordierite containing about 400 flow passages per square inch of cross section was dipped into the washcoat slurry at a depth sufficient to coat 90% of the axial length of the substrate. The excess was blown off the monolith by compressed air. The resultant coated monolith after being calcined at 450° C. contained 72 g/ft$^3$ palladium, 1.43 g/in$^3$ alumina, 0.20 g/in$^3$ CeO$_2$, 0.12 g/in$^3$ ZrO$_2$, 0.12 g/in$^3$ SrO, and 0.09 g/in$^3$ NiO (washcoat component concentration expressed as grams per total substrate volume).

B. Inlet Layer

A washcoat composition was prepared by impregnating a portion of gamma alumina powder having a BET surface area of 150 m$^2$/g with an aqueous solution of rhodium nitrate. The rhodium-containing alumina was combined with cerium-zirconia composite (containing 20 wt. % ceria), zirconium acetate, acetic acid (as a dispersant) and a water in a ball-mill to form the inlet layer slurry containing about 40 percent by weight of solids. The monolith coated with the outlet layer in Part A of the Example was dipped in the inlet layer slurry. The substrate introduced into the inlet layer slurry from the opposite axial end that was coated with outlet layer slurry. The substrate was dipped to a depth sufficient to coat 90% of the axial length of the substrate. After blowing off the excess, drying and calcining, the monolith picked up an additional 1.26 g of washcoat containing 8 g/ft$^3$ of rhodium, 1.43 g/in$^3$ of alumina, 0.08 g/in$^3$ of ZrO$_2$, and 0.82 g/in$^3$ of ceria-zirconia composite. The final coated catalyst contained 72 g/ft$^3$ of palladium and 8 g/ft$^3$ of rhodium (washcoat component concentration expressed as grams per total substrate volume). This catalyst sample is designated as Catalyst B1.

EXAMPLE 4

(Comparative Example) Preparation of a Conventional Bilayer Catalyst Substrate With an Bottom Layer Containing Pd and a Top Layer Containing Rhodium A. Bottom Layer The first (bottom) coat of this catalyst was formed using the slurry used to prepare the inlet layer in Example 3. The entire axial length of a 400 cpsi cordierite monolith substrate of the same dimensions used in Example 3 was coated with the slurry. The excess was blown off the monolith by compressed air. The resultant coated monolith after being calcined at 450° C. contained 72 g/ft$^3$ palladium, 1.43 g/in$^3$ alumina, 0.20 g/in$^3$ CeO$_2$, 0.12 g/in$^3$ ZrO$_2$, 0.12 g/in$^3$ SrO, and 0.09 g/in$^3$ NiO (washcoat component concentration expressed as grams per total substrate volume).

B. Top Layer

A washcoat composition was prepared according to in the inlet layer washcoat preparation of Example 3 to form a washcoat layering slurry containing about 40 percent by weight of solids. The monolith coated with the inlet layer in Part A of the Example was dipped in the second layer slurry to coat the entire axial length of the substrate. After blowing off the excess, drying and calcining, the monolith picked up an additional 1.26 g of washcoat containing 8 g/ft$^3$ of rhodium, 1.43 g/in$^3$ of alumina, 0.08 g/in$^3$ of ZrO$_2$, and 0.82 g/in$^3$ of ceria-zirconia composite. The final coated catalyst contained 72 g/ft$^3$ of palladium and 8 g/ft$^3$ of rhodium (washcoat component concentration expressed as grams per total substrate volume). This catalyst sample is designated as Catalyst F1.

EXAMPLE 5

Preparation of a Three Zone Bilayer Catalyst Having a Palladium/Platinum First Inlet Layer and a Platinum/Rhodium Second Layer (Exemplifies the Preparation of Catalyst A)

A. First Inlet Layer

The first inlet layer slurry was prepared using essentially the same procedure as described for the preparation of the slurry used to prepare the First Layer in the Example of PCT publication WO 95/35152, herein incorporated by reference. One axial end of a monolith substrate (3.15×4.75×2.98 in, oval) of cordierite containing about 400 flow passages per square inch of cross section was dipped into the first inlet layer slurry at a depth sufficient to coat 70% of the axial length of the substrate. The excess was blown off the monolith substrate by compressed air. The resultant coated monolith after being calcined at 450° C. contained 2.0 g/ft$^3$ of platinum, 175 g/ft3 of palladium, 0.75 g/in$^3$ of alumina, 0.05 g/in$^3$ of ZrO$_2$, 0.50 g/in$^3$ of ceria-zirconia composite, 0.05 g/in$^3$ of CeO$_2$, 0.20 g/in$^3$ of SrO, 0.08 g/in$^3$ of La$_2$O$_3$, and 0.05 g of Nd$_2$O$_3$ (washcoat component concentration expressed as grams per coated catalyst volume).

B. First Outlet Layer

The first outlet layer slurry was prepared using essentially the same procedure as described for the preparation of the slurry used to prepare the Second Layer in the Example of PCT publication WO 95/35152. The monolith coated with the first inlet layer in Part A of the Example was dipped in the first outlet layer slurry. The substrate introduced into the first outlet layer slurry from the uncoated axial end. The substrate was dipped to a depth sufficient to coat 70% of the axial length of the substrate. After blowing off the excess, drying and calcining, the monolith picked up an additional 1.19 g/in$^3$ of washcoat. The coated catalyst volumes of the first outlet slurry were 10.5 g/ft$^3$ of platinum, 12.5 g/ft$^3$ of rhodium, 0.35 g/in$^3$ of alumina, 0.04 g/in$^3$ of ZrO$_2$, and 0.75 g/in$^3$ of ceria-zirconia composite. The final coated catalyst contained 140 g/ft$^3$ of platinum group metal (washcoat component concentration expressed as grams per coated catalyst volume). This catalyst is designated catalyst A1.

EXAMPLE 6

Preparation of a Single Pass Double-Coated Catalyst Substrate Having a Palladium/Platinum First Inlet Layer and a Platinum/Rhodium Second Layer with a Second Inlet Layer Containing Palladium (Exemplifies the Preparation of Catalyst D1)

A second inlet layer slurry was prepared by impregnating gamma alumina powder having a BET surface area of 150 m$^2$/g with an aqueous solution of palladium nitrate. The inlet axial end of Catalyst A1 of Example 5 was dipped into the second slurry at a depth sufficient to coat 30% of the axial length of the substrate. After blowing off the excess, drying and calcining, this segment of the monolith picked up an additional 0.27 g/in$^3$ of washcoat containing 200 g/ft$^3$ of palladium and 0.2 g/in$^3$ of alumina (washcoat component concentration expressed as grams per coated catalyst volume). This catalyst sample is designated as Catalyst D1. Catalyst F contains the same total amount of platinum group metal loading as the conventional bilayer catalyst, Catalyst G1 (vide infra).

EXAMPLE 7

(Comparative Example) Preparation of a Conventional Bilayer Catalyst Substrate Having a Palladium/Platinum First Layer and a Platinum/Rhodium Second Layer A 400 cpsi cordierite monolith catalyst having the same dimensions as Example 5 was prepared using essentially the same procedure as described in the Example of PCT publication WO 95/35152, hereby incorporated by reference. After coating the substrate with the first layer slurry, drying and calcination at 450° C., the first (bottom) layer contained 2.0 g/ft$^3$ of palladium, 175 g/ft$^3$ of palladium, 0.75 g/in$^3$ of alumina, 0.05 g/in$^3$ of ZrO$_2$, 0.50 g/in$^3$ of ceria-zirconia composite, 0.05 g/in$^3$ of CeO$_2$, 0.20 g/in$^3$ of SrO, 0.08 g/in$^3$ of La203, and 0.05 g of Nd$_2$O$_3$ (washcoat component concentration expressed as grams per coated catalyst volume). After coating the substrate with the second layer slurry, the monolith substrate picked up an additional 1.19 g/in$^3$ of washcoat containing 10.5 g/ft$^3$ of platinum, 12.5 g/ft$^3$ of rhodium, 0.35 g/in$^3$ of alumina, 0.08 g/in$^3$ of ZrO$_2$, contained 12.5 g/ft$^3$ of platinum, 175 g/ft$^3$ of palladium and 12.5 g/ft$^3$ of rhodium (washcoat component concentration expressed as grams per coated catalyst volume). This catalyst is designated catalyst G1. Catalyst G1 contained the same amount of total platinum group metal loading as Catalyst D1 (vide supra).

EXAMPLE 8

Catalyst Performance of Catalyst C1 and E1

The catalysts, 85 in$^3$ in volume each, produced according to Examples 1 and 2 were individually loaded in converters of identical shape. The converters were then individually aged on a Ford 4.6 liter V-8 engine at a converter inlet temperature of 850° C. for 75 hours using a specific aging cycle. This procedure simulates aging of the catalyst after 50,000 miles of vehicle operation. The aging cycle consists of four phases totaling 60 seconds.

1. First phase lasts 40 seconds and engine operates at stoichiometric set point in steady state.

2. Second phase for 6 seconds and engine operates bias rich which produces 3 percent CO in the exhaust.

3. Third phase for 10 seconds and the engine operates similar to phase 2 except secondary air in injected to generate 3 percent $O_2$ in the exhaust.

4. Fourth phase for 4 seconds and engine operates back to normal stoichiometric setting similar to phase I while the air injection continues.

After the aging the catalysts were evaluated on a V-8 engine dynamometer at an inlet temperature of 450° C. and 80,000 $hr^{-1}$ space velocity wherein the air-to-fuel ratio (A/F) employed was fluctuated +/−0.5 A/F units at 1 Hz perturbations.

Figure 11:
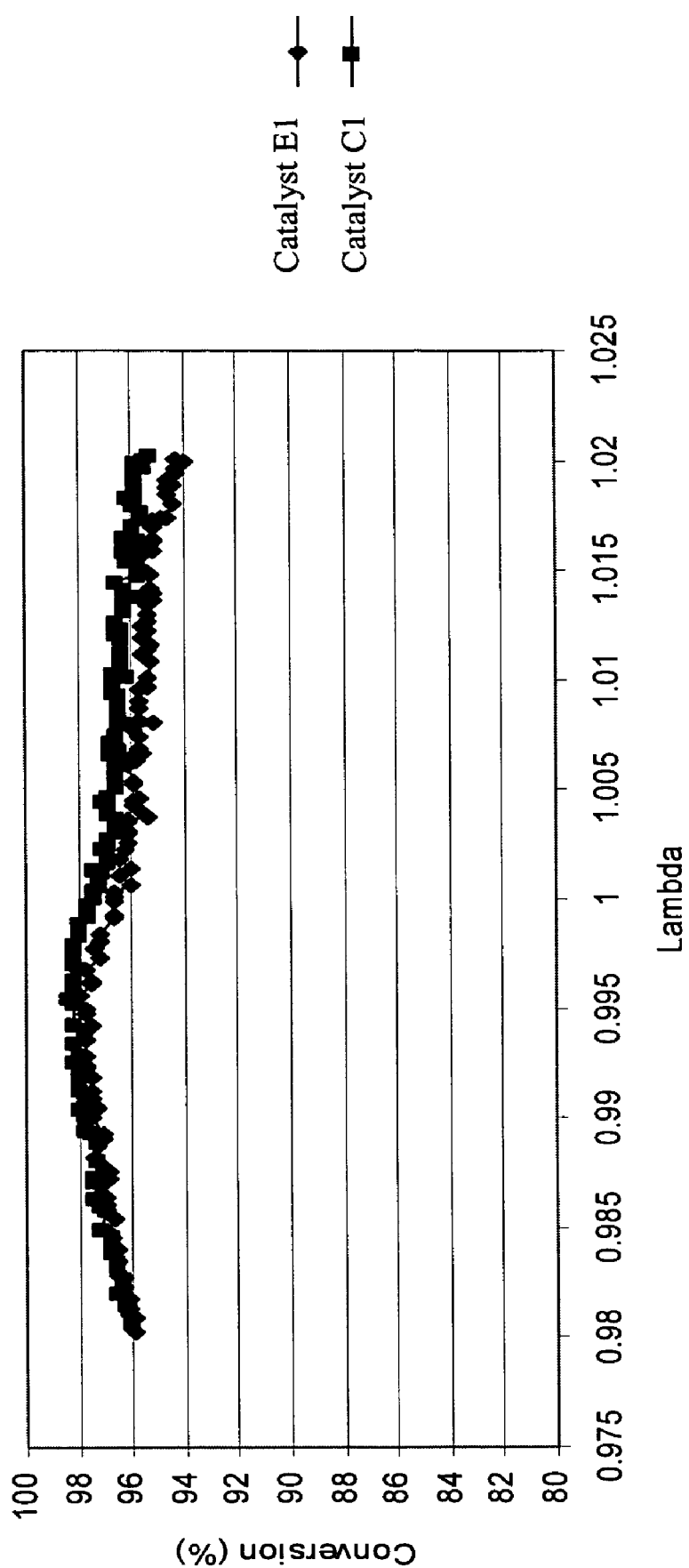
FIG. 11 graphically presents the hydrocarbon conversion percentage as a function of λ for an exhaust system outfitted with one embodiment of a catalyst of the invention and for an exhaust system outfitted with a comparative catalyst.
Figure 12:
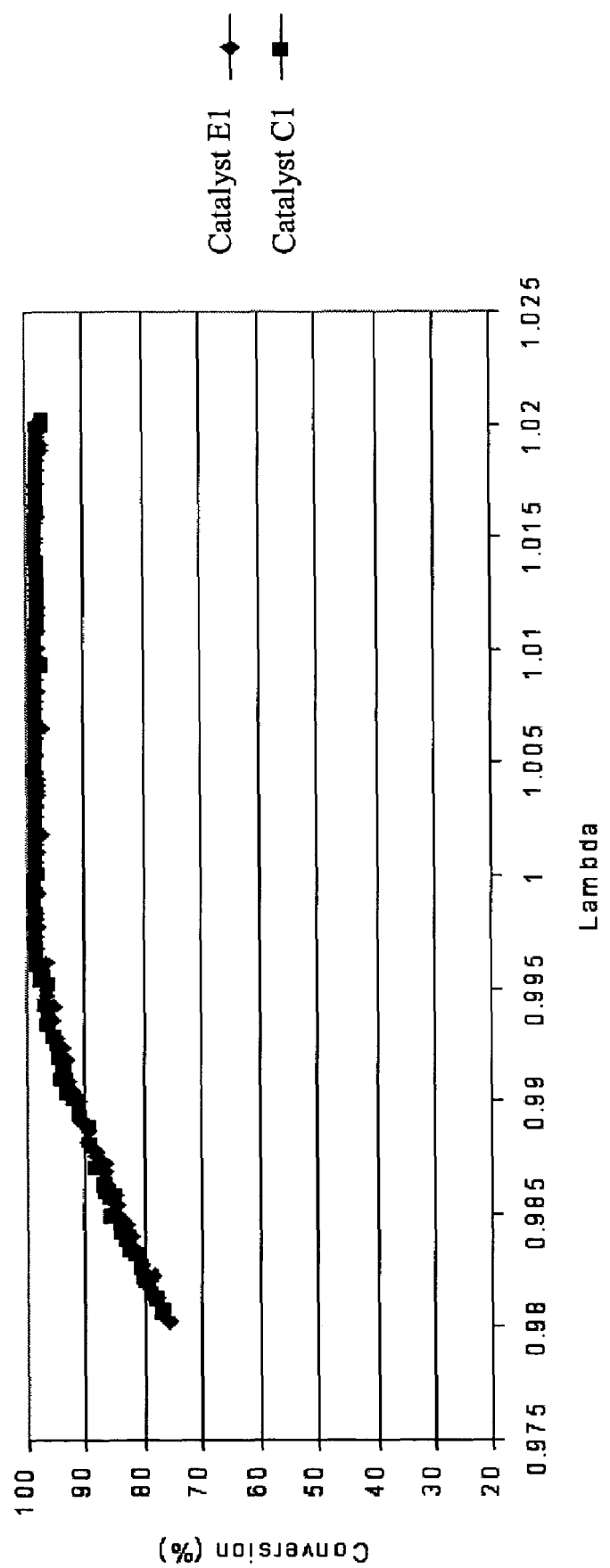
FIG. 12 graphically presents the carbon monoxide conversion percentage as a function of λ for an exhaust system outfitted with one embodiment of a catalyst of the invention and for an exhaust system outfitted with a comparative catalyst.
Figure 13:
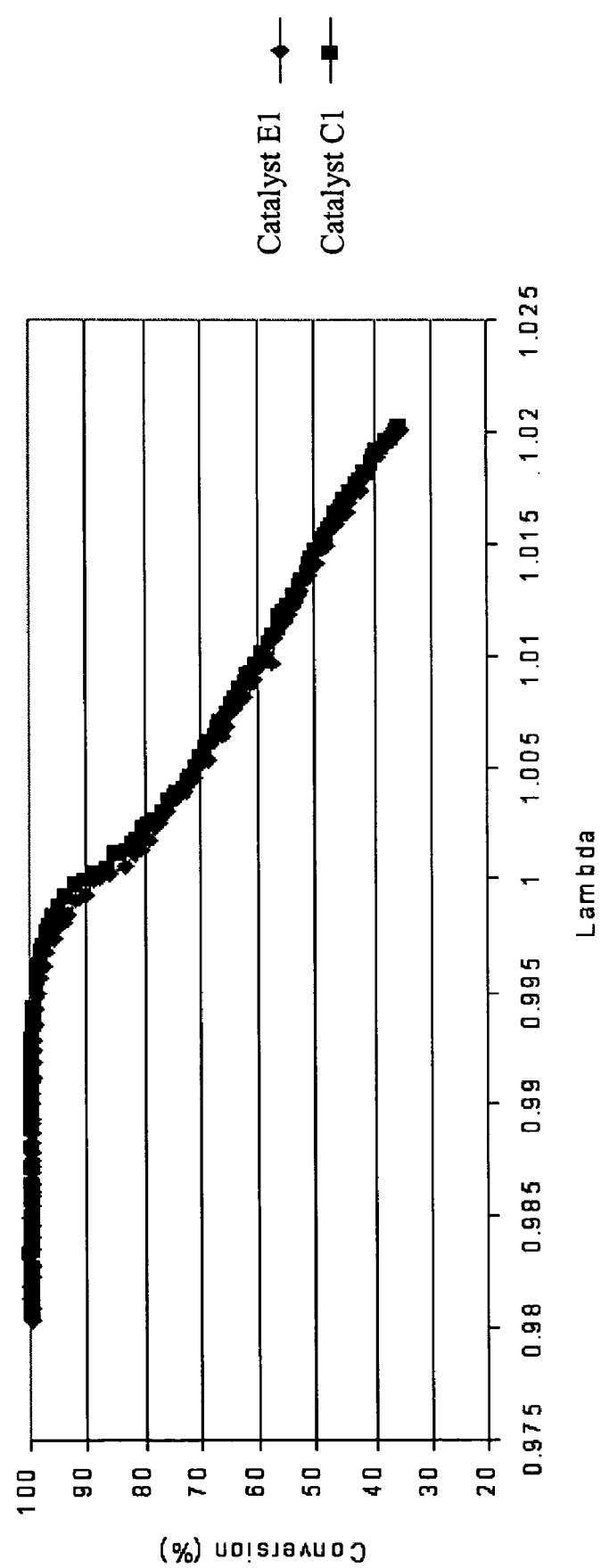
FIG. 13 graphically presents the nitrogen oxides (NOx) conversion percentage as a function of λ for an exhaust system outfitted with one embodiment of a catalyst of the invention and for an exhaust system outfitted with a comparative catalyst.

The comparative catalyst performance of Catalyst C1 and Catalyst E1 are summarized in FIGS. 11, 12 and 13. In each of these Figures, the abscissa correspond to the A/F ratio expressed as a fraction (λ) of the stoichiometric A/F ratio (i.e., 14.6). Thus, for example λ's less than 1 correspond to A/F ratios that are rich of stoichiometric ratio and λ's greater than 1 correspond to A/F ratios lean of stoichiometric. FIG. 11 graphically presents the hydrocarbon conversion percentage as a function of λ. FIG. 12 graphically presents the carbon monoxide conversion percentage as a function of λ. FIG. 13 graphically presents the nitrogen oxides (NOx) conversion percentage as a function of λ. As can be seen in the figures, Catalyst C1 shows nearly identical catalyst performance characteristics as the comparative Catalyst E1 at a range of A/F ratios.

Figure 14:
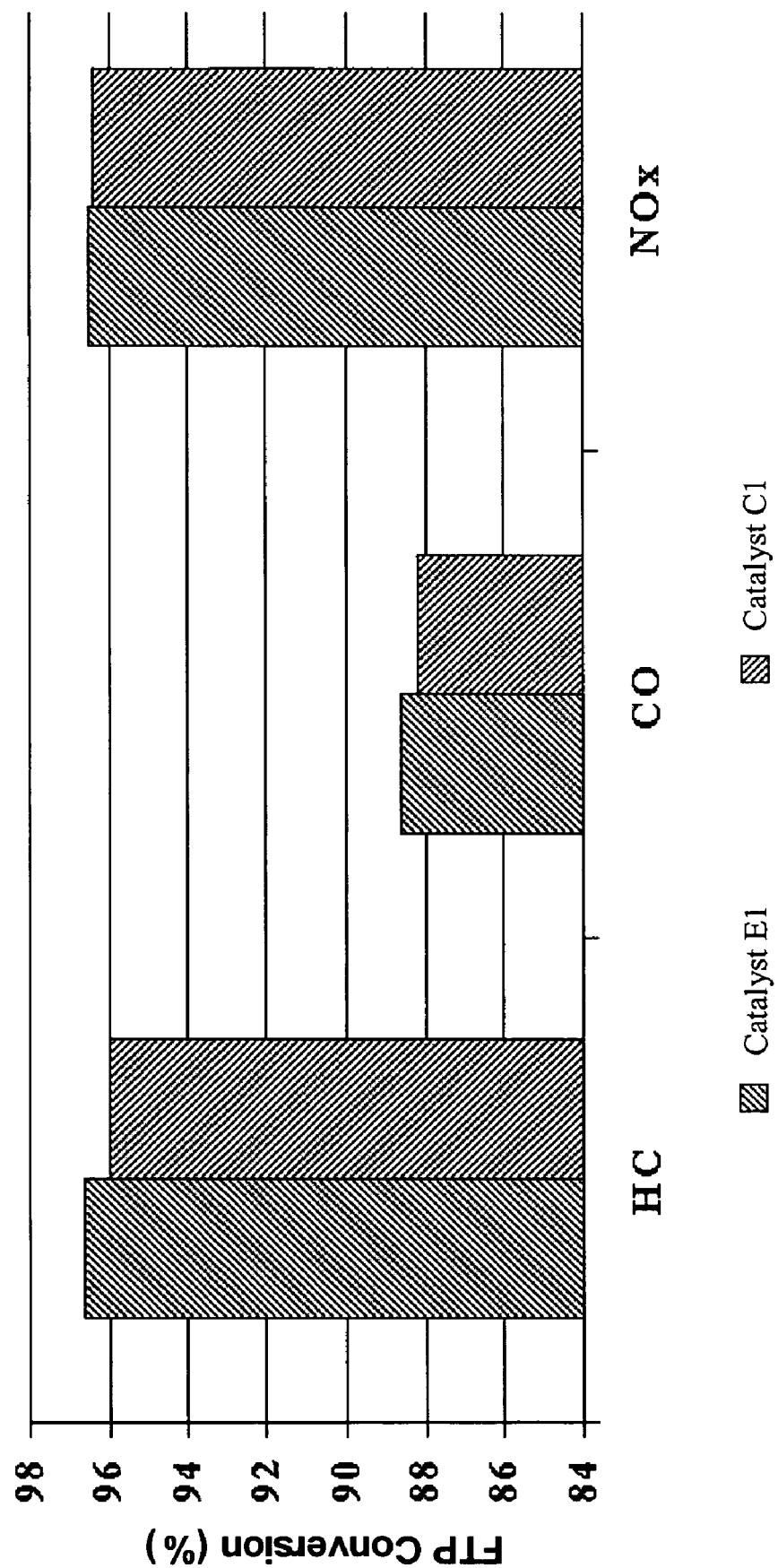
FIG. 14 is a graph showing the results of a U.S. Federal Test Procedure in which there is plotted the percentage of pollutants converted to innocuous substances by one embodiment of a catalyst of the invention being tested as compared to a reference catalyst.

After 50,000 mile equivalent aging, the hydrocarbon (HC), carbon monoxide and NOx conversions of Catalyst C1 and E1 were evaluated using the FTP 1975 with a 4.6 L engine vehicle. The HC, CO and NOx conversions are presented in FIG. 14.

EXAMPLE 9

Catalyst Performance of Catalyst B1 and F1 (Comparative Catalyst)

This example illustrates certain catalyst performance advantages that typify the catalysts of the invention due to their coating architectures. In this example, Catalyst B1 and F1 are subjected to 50,000 mile equivalent aging as described in Example 8. The two catalysts were then evaluated for hydrocarbons and NOx emissions by bag average tailpipe emissions according to FTP 1975 with a 4.6 L engine vehicle. Catalyst B1 was placed in the converter by specifically orienting the catalyst to exhaust so that the inlet layer (containing a rhodium component) was nearest the engine outlet and the outlet layer (containing the palladium component) was nearest to the exhaust outlet. In this configuration, the exhaust gas first contacted the layer containing the rhodium component before contacting the zone having both the palladium and rhodium components.

Figure 9:
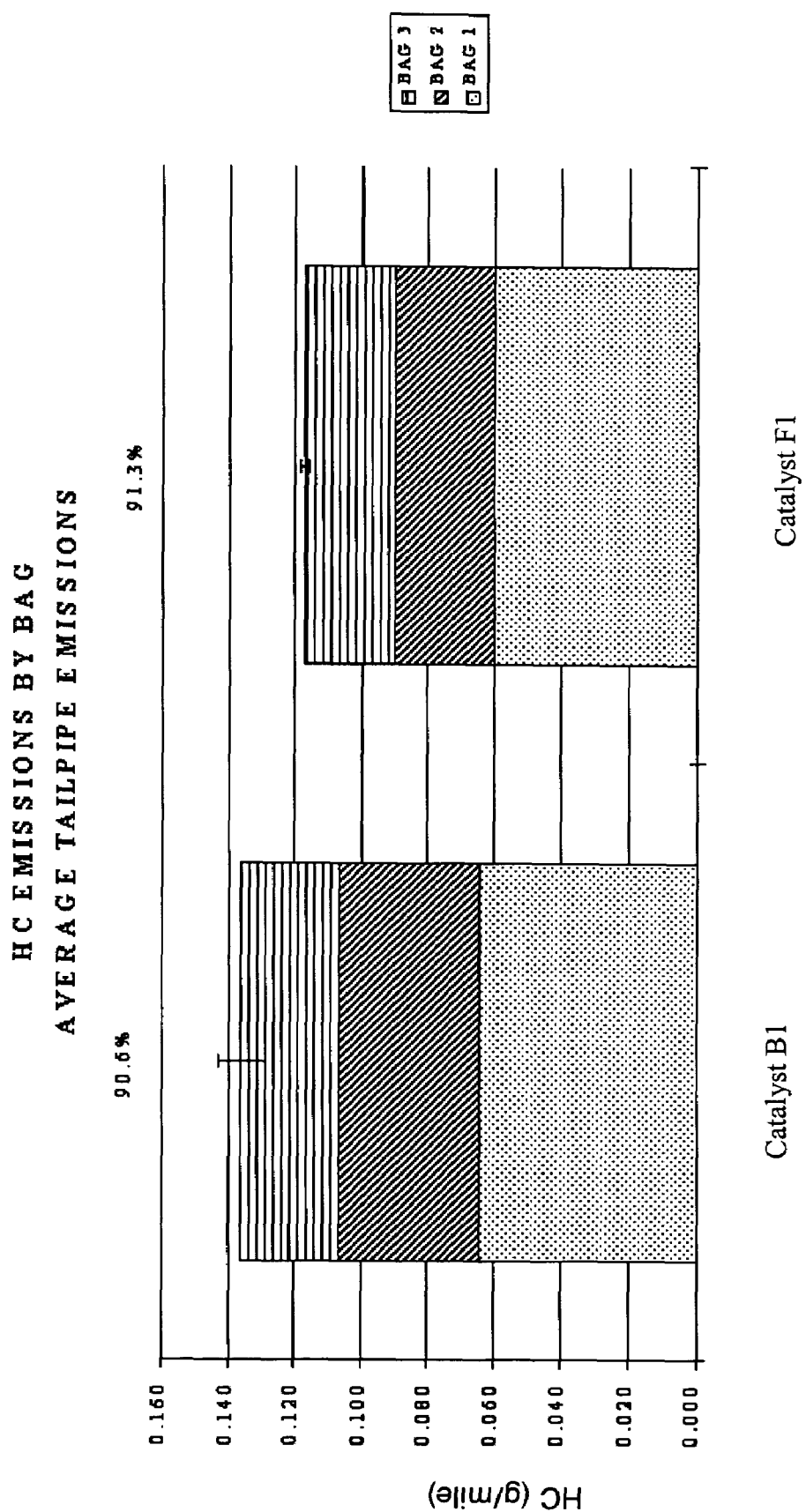
FIG. 9 is a graph of the U.S. Federal Test Procedure in which the bag average tailpipe hydrocarbons (HC) emissions are collected from an exhaust system using one embodiment of a catalyst of the invention and an exhaust using a comparative catalyst.
Figure 10:
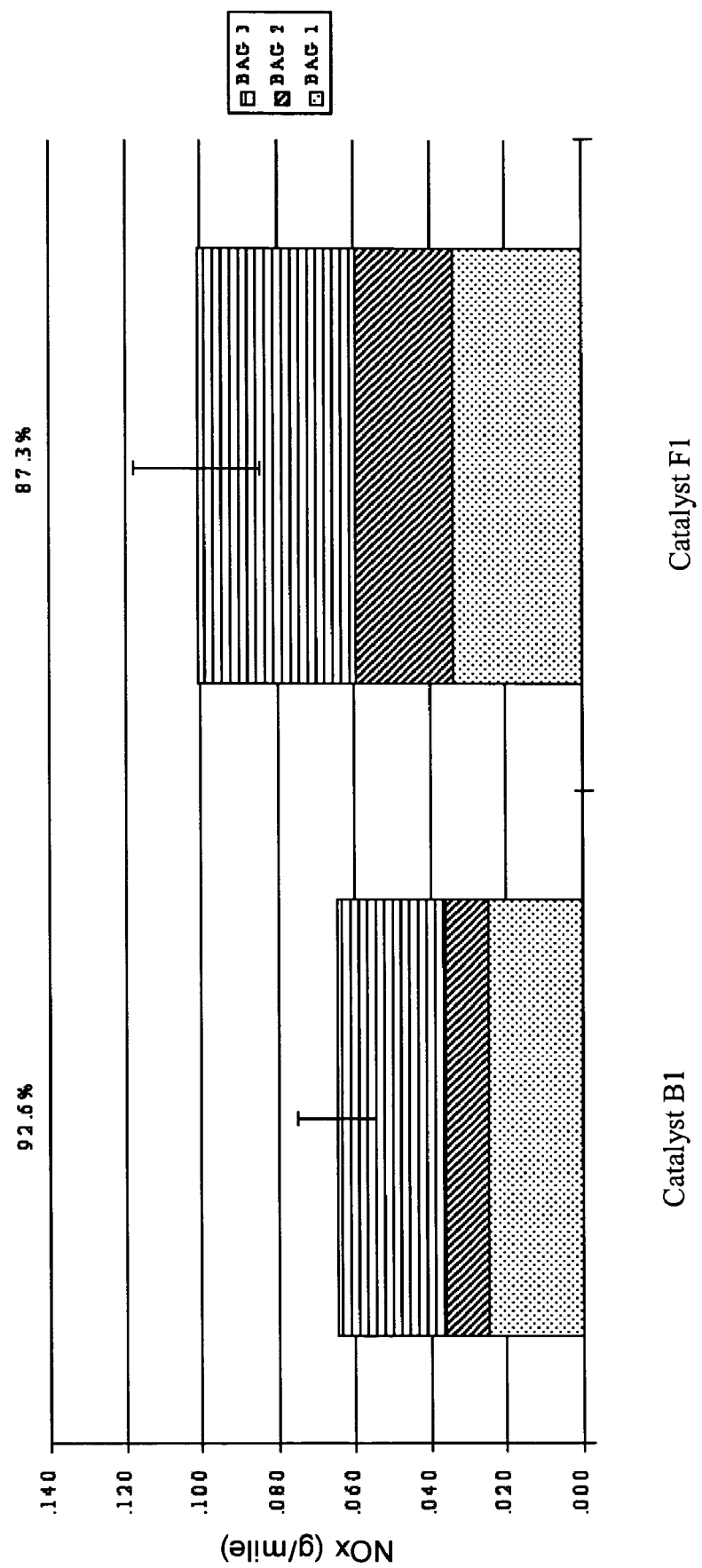
FIG. 10 is a graph of the U.S. Federal Test Procedure in which the bag average tailpipe nitrogen oxides (NOx) emissions are collected from an exhaust system using one embodiment of a catalyst of the invention and an exhaust system using a comparative catalyst.

The results of the evaluation for the two catalysts are shown in FIGS. 9 and 10. The emissions in the Figures are expressed as g/mile along the ordinates. As can be seen in FIG. 9, slightly higher amounts of hydrocarbons were collected for Catalyst B1 compared to the conventional Catalyst F1.

In contrast, as seen from the results presented in FIG. 10, less NOx emissions were collected for Catalyst B1 than for Catalyst F1. In addition the conversion percentage of the NOx emissions is 92.6% for Catalyst B1 and 87.3% for Catalyst F1. The improved NOx performance for Catalyst B1 as compared to Catalyst F1 shows the superiority of the catalyst architecture of the invention with respect to abating a specific pollutant component. Thus, there is a directional benefit obtained as a consequence of the combination of the orientation of the catalyst of the invention to the exhaust stream and the coating architecture.

| Catalyst | % Conversion Efficiencies | |
| --- | --- | --- |
| | HC | NOx |
| Catalyst B1 | 90.6 | 92.6 |
| Catalyst F1 (Comparative) | 91.3 | 87.3 |

EXAMPLE 10

Catalyst Performance of Catalyst A1, D1 and G1 by Bag Analysis

This example illustrates the enhanced catalyst performance of catalysts having a thin second inlet layer having high palladium content over conventional catalysts. In this example, Catalyst A1, D1 and G1 are subjected to 50,000 mile equivalent aging as described in Example 8. The three catalysts were then evaluated for hydrocarbon emissions by bag average tailpipe emissions according to the Federal Test Procedure (1975) with a 4.6 L engine vehicle. The results of the evaluation are presented in FIG. 15, where the hydrocarbon emissions (HC) are expressed as g/mile along the ordinates. The conversion percentage above each of the columns of the bar graph indicate the percentage of hydrocarbon converted in the FTP 1975 test.

Figure 15:
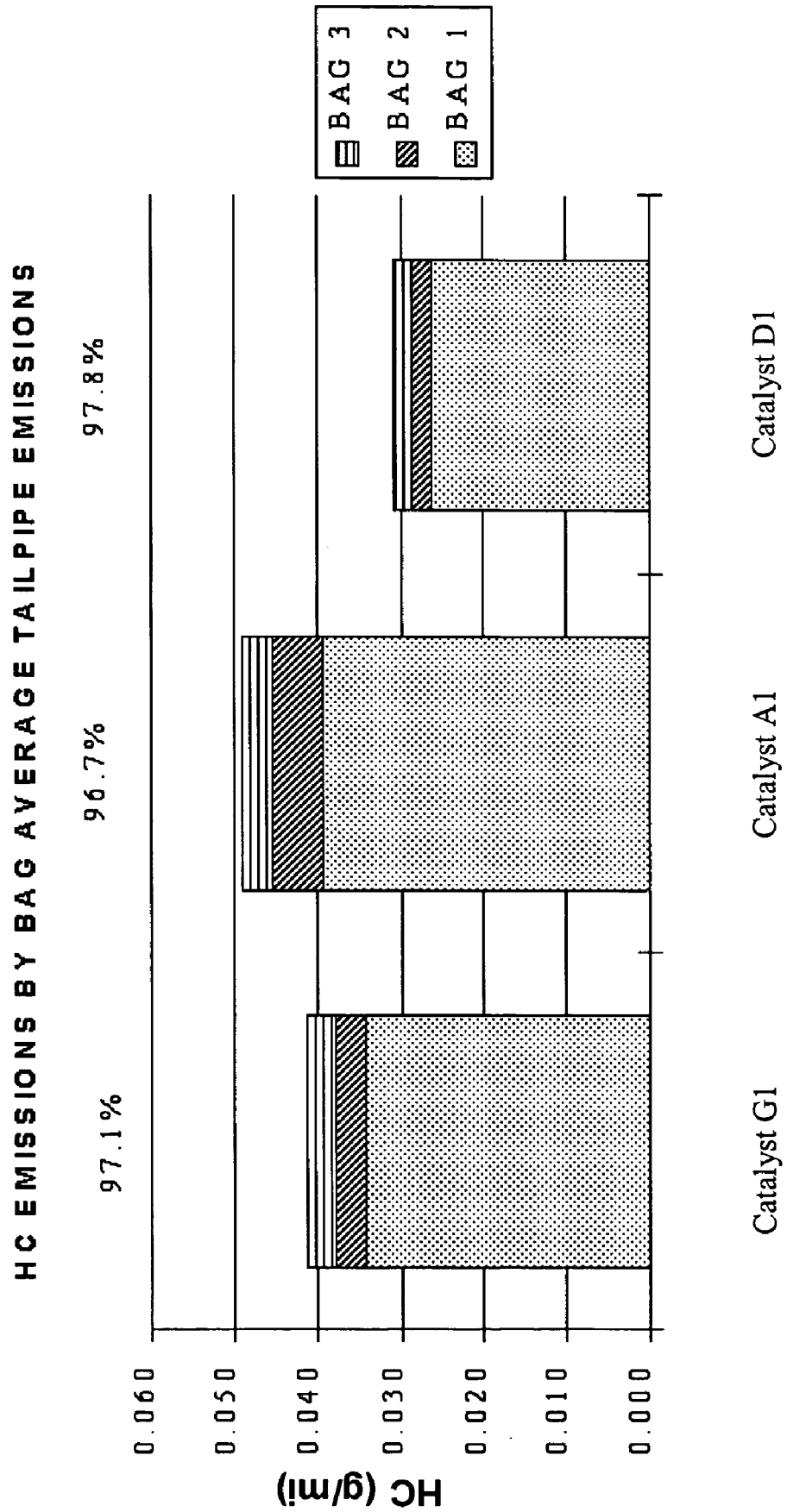
FIG. 15 is a graph showing the results of the U.S. Federal Test Procedure in which the bag average tailpipe hydrocarbons (HC) emissions are collected from an exhaust system outfitted with one embodiment of a catalyst of the invention, and exhaust systems outfitted with two comparative catalysts.

As can be seen in FIG. 15, the hydrocarbon exhaust collected using conventional bilayer Catalyst G1 was about 0.042 g/mi, while a larger quantity (0.048 g/mi) was collected using Catalyst A1. The larger quantity of hydrocarbon collected for Catalyst A1 was expected due to its 30% less total platinum group metal loading relative to Catalyst G1 as a result of the coating architecture.

In contrast, the total hydrocarbon emissions collected for Catalyst D1 was significantly less (0.031 g/mi) than the amount collected for the conventional bilayer Catalyst G1. The result illustrates one of the performance advantages obtained using a coating architecture having a second inlet layer that defines a hydrocarbon burnoff zone along the length of the catalyst. Here, both Catalysts D1 and G1 contain the same total amount of platinum group metal content. The coating architecture of Catalyst D1 results in a more effective utilization of the platinum group metals, which in turn, results in decreased hydrocarbon emissions.

| Catalyst | % HC Conversion HC |
| --- | --- |
| Catalyst A1 | 96.7 |
| Catalyst D1 | 97.8 |
| Catalyst G1 (Comparative) | 97.1 |

EXAMPLE 11

Catalyst Performance of Catalyst A1, D1 and G1 by Vehicle Evaluation

The performance of Catalysts A1, D1 and G1 were evaluated by determining the cumulative hydrocarbon emission on 1998 Ford Crown Victoria having an 8 cylinder 4.6 L engine according to the FTP 1975 test. Each of the catalysts (76.5 in$^3$) were dynamometer-aged at 50,000 miles and installed in a canister in the exhaust train of the vehicle. The results of the evaluation are graphically presented in FIG. 16, where the abscissa corresponds to the time (seconds), the left ordinate to the cumulative hydrocarbon tailpipe emissions and the right ordinate to the vehicle speed (km/hr).

Figure 16:
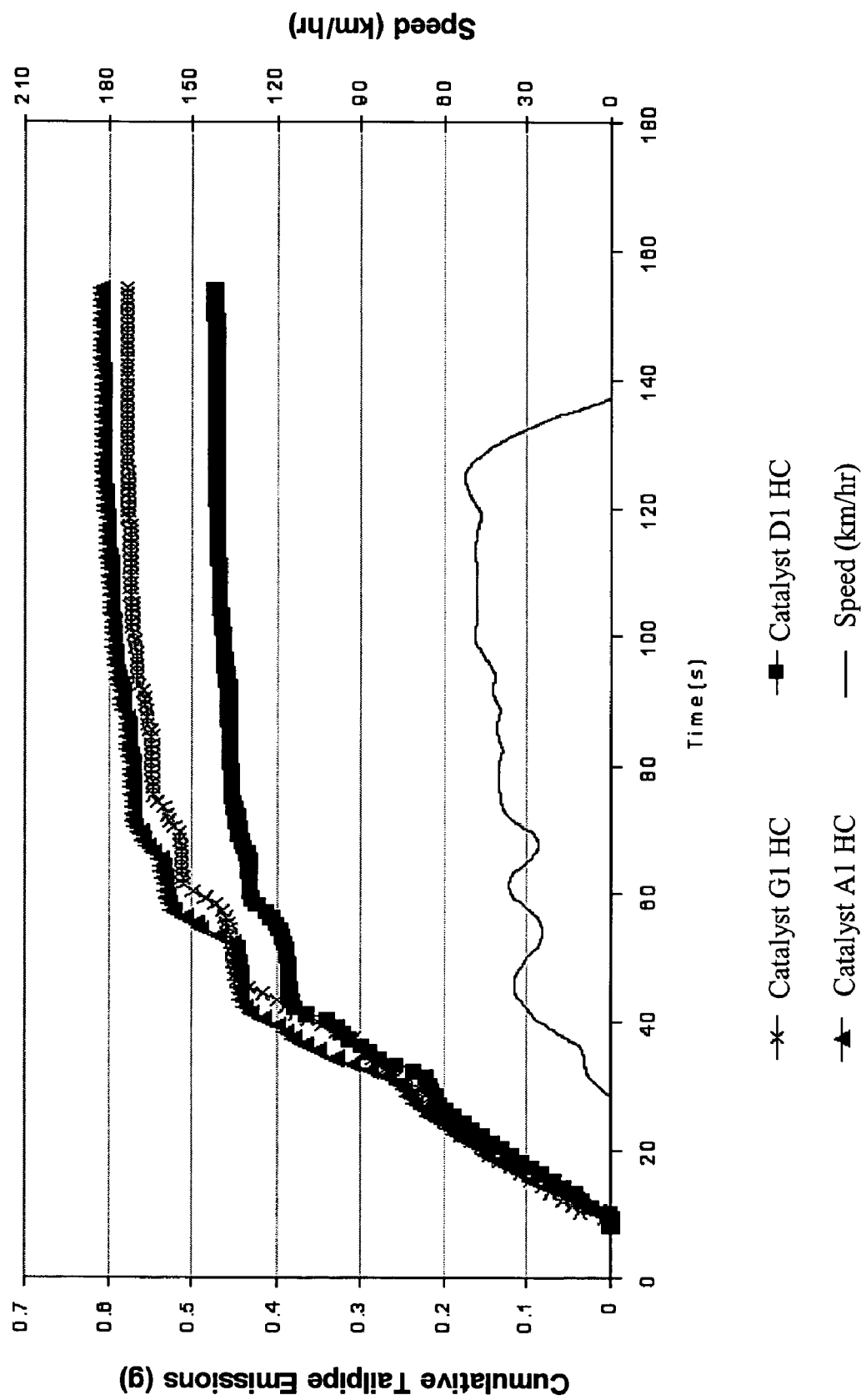
FIG. 16 is a graph showing the results of the U.S. Federal Test Procedure in which the cumulative tailpipe hydrocarbon (HC) emissions are plotted on the left vertical axis, the vehicle speed (km/hr) is plotted on the right axis and the elapsed time of the test (in seconds) is plotted on the horizontal axis.

It is apparent from FIG. 16 that during the test run conducted with Catalyst D1, fewer hydrocarbons are collected than for the run conducted with the conventional bilayer Catalyst G1. While the total platinum group metal loading is the same for both catalysts, their coating architectures are different. Here again, the optimized placement of the platinum group metals resulting from the zones created by the coating architecture in Catalyst D1 results in superior hydrocarbon performance.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. An exhaust gas treatment article, comprising:
a substrate comprising an inlet axial end, an outlet axial end, wall elements having a length extending between the inlet axial end to the outlet axial end and a plurality of axially enclosed channels defined by the wall elements;
an outlet layer deposited on the wall elements beginning at the outlet axial end and having a length extending for less than the wall elements' length, wherein the outlet layer comprises a first outlet palladium component;
an inlet layer beginning at the inlet axial end and having a length extending for less than the wall elements' length, the inlet layer at least partially overlying the wall elements and the inlet layer, wherein the inlet layer comprises an inlet rhodium component; and
wherein the inlet layer further comprises: an inlet refractory oxide support; and an inlet oxygen storage component; and the outlet layer comprises an outlet support.

2. An exhaust gas treatment article, comprising:
a substrate comprising an inlet axial end, an outlet axial end, wall elements having a length extending between the inlet axial end to the outlet axial end and a plurality of axially enclosed channels defined by the wall elements;
an outlet layer deposited on the wall elements beginning at the outlet axial end and having a length extending for at least 90% and no more than 97% of the wall elements' length, wherein the outlet layer comprises a first outlet palladium component;
an inlet layer beginning at the inlet axial end and having a length extending for at least 90% and no more than 97% of the wall elements' length, the inlet layer at least partially overlying the wall elements and the inlet layer, wherein the inlet layer comprises an inlet rhodium component; and
wherein the inlet layer further comprises: an inlet refractory oxide support; and an inlet oxygen storage component; and the outlet layer comprises an outlet refractory oxide support.

3. An exhaust gas treatment article, comprising:
a substrate comprising an inlet axial end, an outlet axial end, wall elements having a length extending between the inlet axial end to the outlet axial end and a plurality of axially enclosed channels defined by the wall elements;
a first inlet layer deposited on the wall elements beginning at the inlet axial end and having a length extending for less than the wall elements' length;
a first outlet layer beginning at the outlet axial end and having a length extending for less than the wall elements' length, the first outlet layer at least partially overlying the wall elements and the first inlet layer; and
a second layer that is one of: a) a second inlet layer overlying at least part of the first inlet layer, beginning at the inlet axial end and having a length extending for no more than 50% of the wall elements' length, or b) a second outlet layer overlying at least part of the first outlet layer, beginning at the outlet axial end and having a length extending for no more than 50% of the wall elements' length.

4. The exhaust article of claim 3, wherein the first inlet layer and the first outlet extend for at least 60% of the wall elements' length.

5. The exhaust gas treatment article of claim 3, wherein the second layer comprises a washcoat loading of less than 1.5 g/in$^3$.

6. The exhaust gas treatment article of claim 3, wherein the second layer comprises a washcoat loading of less than 0.5 g/in$^3$.

7. The exhaust article of claim 3, wherein the second layer is according to (a).

8. The exhaust gas treatment article of claim 7, wherein the second inlet layer comprises one or more platinum group metal components having a loading of at least 20 g/ft$^3$.

9. The exhaust article of claim 7, wherein the second inlet layer comprises a second inlet palladium component.

10. The exhaust article of claim 9, wherein the second inlet layer further comprises a second inlet platinum component.

11. The exhaust article of claim 9, wherein there is at least 80 g/ft$^3$ of second inlet palladium component in the second inlet layer.

12. The exhaust article of claim 9, wherein the first inlet layer comprises: a first inlet palladium component, a first inlet refractory oxide support, and a first inlet oxygen storage component; and the first outlet layer comprises: a first outlet platinum component, a first outlet rhodium component, and a first outlet refractory oxide support.

13. The exhaust article of claim 12, wherein the first inlet layer further comprises a first inlet platinum component.

14. The exhaust article of claim 3, wherein the second layer is according to (b).

15. The exhaust article of claim 14, wherein the second outlet layer comprises a second outlet palladium component.

16. The exhaust article of claim 15, wherein the second outlet layer comprises at least 80 g/ft$^3$ of the second outlet palladium component.

17. The exhaust article of claim 15, wherein the second outlet layer further comprises a second outlet platinum component.

18. The exhaust article of claim 15, wherein the first inlet layer comprises: a first inlet palladium component, a first inlet refractory oxide support, and a first inlet oxygen storage component; and the first outlet layer comprises: a first outlet platinum component; a first outlet rhodium component; and a first outlet refractory oxide support.

19. The exhaust article of claim 18, wherein the first inlet layer composition further comprises a first inlet platinum component.

20. An exhaust article comprising a substrate comprising
an inlet axial end, an outlet axial end, wall elements having a length extending between the inlet axial end to the outlet axial end and a plurality of axially enclosed channels defined by the wall elements;
an undercoat layer deposited on the wall elements and having a length extending from the inlet axial end to the outlet axial end; a first inlet layer deposited on the undercoat layer beginning at the inlet axial end and having a length extending for less than the wall elements' length;
a first outlet layer beginning at the outlet axial end and having a length extending for less than the wall elements' length, the first outlet layer at least partially overlying the undercoat layer and the first inlet layer; and
a second outlet layer overlying at least part of the first outlet layer, beginning at the outlet axial end and having a length extending for no more than 50% of the wall elements' length.

21. The exhaust article of claim 20, wherein the second outlet layer comprises a second outlet rhodium component.

22. The exhaust article of claim 21, wherein the second outlet layer further comprises a second outlet platinum component.

23. The exhaust article of claim 22, wherein the second outlet layer comprises at least 5 g/ft$^3$ of a sum of the second outlet component rhodium component and the second outlet platinum component.

24. The exhaust article of claim 20, wherein the undercoat layer comprises hydrocarbon trapping material.

25. The exhaust article of claim 20, wherein the undercoat layer comprises NOx adsorption material.

* * * * *